United States Patent [19]
Behr et al.

[11] Patent Number: 6,107,944
[45] Date of Patent: *Aug. 22, 2000

[54] ELECTRONIC NAVIGATION SYSTEM AND METHOD

[75] Inventors: David A. Behr, Roselle; Ramesh Ramakrishnan, Mount Prospect, both of Ill.

[73] Assignee: Navigation Technologies Corporation, Rosemont, Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/151,255

[22] Filed: Sep. 10, 1998

Related U.S. Application Data

[63] Continuation of application No. 08/494,198, Jun. 23, 1995, Pat. No. 5,808,566, which is a continuation-in-part of application No. 08/265,094, Jun. 24, 1994, Pat. No. 5,543,789.

[51] Int. Cl.[7] .................................................. G08G 1/123
[52] U.S. Cl. .......................... 340/995; 340/988; 701/208; 701/209; 701/211
[58] Field of Search .................................... 340/995, 990, 340/991, 988, 905; 701/209, 211, 208, 210

[56] References Cited

U.S. PATENT DOCUMENTS

| | | |
|---|---|---|
| 4,301,506 | 11/1981 | Turco . |
| 4,311,876 | 1/1982 | Endo et al. ............................ 340/905 |
| 4,428,057 | 1/1984 | Setliff et al. . |
| 4,466,125 | 8/1984 | Kanayama ............................. 340/990 |
| 4,481,584 | 11/1984 | Holland . |
| 4,546,439 | 10/1985 | Esparza . |
| 4,570,227 | 2/1986 | Tachi et al. . |
| 4,642,775 | 2/1987 | Cline et al. . |
| 4,733,356 | 3/1988 | Haeussermann et al. . |

(List continued on next page.)

FOREIGN PATENT DOCUMENTS

| | | |
|---|---|---|
| 0 379 198 A3 | 7/1990 | European Pat. Off. . |
| 0 585 950 A2 | 9/1993 | European Pat. Off. . |
| 41 41 597 A1 | 12/1991 | Germany . |
| 3150699 | 6/1991 | Japan . |
| 6266997 | 9/1994 | Japan . |

(List continued on next page.)

OTHER PUBLICATIONS

Hoffman, Steve and Stewart, Charles, "Text–based Routing: An Affordable Way Ahead?", Proceedings of the IEEE–IEE Vehicle Navigation & Information System Conference, Ottawa, Canada—VNIS 1993.

(List continued on next page.)

*Primary Examiner*—Brent A. Swarthout
*Attorney, Agent, or Firm*—Frank J. Kozak; Lawrence M. Kaplan

[57] ABSTRACT

The invention provides a method and system for providing route guidance and other information from a base unit to a remote unit in response to a request from the remote unit. A query is formatted at the remote unit, the query including the request, and is transmitted from the remote unit to the base unit. Requested route guidance information is calculated at the base unit in response to the query, using a large up-to-date database located at the base unit. A response to the query is formatted at the base unit, the response including route guidance information. The response is then transmitted from the base unit to the remote unit for display. The transmission is made in a compact form through the use of maneuver arms and combined maneuver arms and through the use of tokenized forms. A maneuver arm represents a road at an intersection, for depiction on a display, by one or two endpoint coordinates. The tokenized forms are expanded at the remote unit into textual driving instructions for each of one or more languages. In addition, the amount of information available at a remote unit can be increased by providing the remote unit with information from the base unit which is not adequately covered by any databases on-board the remote unit.

18 Claims, 15 Drawing Sheets

U.S. PATENT DOCUMENTS

| | | | |
|---|---|---|---|
| 4,758,959 | 7/1988 | Thoone et al. . | |
| 4,780,717 | 10/1988 | Takanabe et al. | 340/995 |
| 4,812,843 | 3/1989 | Champion, III et al. | 340/905 |
| 4,819,174 | 4/1989 | Furuno et al. | 340/995 |
| 4,951,212 | 8/1990 | Kurihara et al. | 340/395 |
| 4,954,958 | 9/1990 | Savage et al. . | |
| 4,954,959 | 9/1990 | Moroto et al. | 340/995 |
| 4,974,170 | 11/1990 | Bouve et al. | 395/357 |
| 5,043,902 | 8/1991 | Yokoyama et al. | 340/988 |
| 5,067,081 | 11/1991 | Person | 340/995 |
| 5,113,178 | 5/1992 | Yasuda et al. | 340/995 |
| 5,126,941 | 6/1992 | Gurmu et al. | 340/989 |
| 5,172,321 | 12/1992 | Ghaem et al. | 340/995 |
| 5,187,810 | 2/1993 | Yoneyama et al. | 340/905 |
| 5,214,757 | 5/1993 | Mauney et al. | 395/161 |
| 5,243,528 | 9/1993 | Lefebvre | 340/995 |
| 5,262,775 | 11/1993 | Tamai et al. | 340/995 |
| 5,283,575 | 2/1994 | Kao et al. | 340/990 |
| 5,289,572 | 2/1994 | Yano et al. | 395/155 |
| 5,291,412 | 3/1994 | Tamai et al. . | |
| 5,291,413 | 3/1994 | Tamai et al. . | |
| 5,293,163 | 3/1994 | Kakihara et al. | 340/988 |
| 5,293,484 | 3/1994 | Dabbs, III et al. | 340/825.44 |
| 5,359,527 | 10/1994 | Takanabe et al. | 340/990 |
| 5,396,429 | 3/1995 | Hanchett . | |
| 5,406,490 | 4/1995 | Braegas | 340/905 |
| 5,406,493 | 4/1995 | Goto et al. | 340/995 |
| 5,424,951 | 6/1995 | Nobe et al. . | |
| 5,465,088 | 11/1995 | Braegas | 340/905 |
| 5,537,323 | 7/1996 | Schulte . | |
| 5,543,789 | 8/1996 | Behr et al. | 340/995 |
| 5,559,707 | 9/1996 | DeLorme et al. | 340/995 |
| 5,579,535 | 11/1996 | Orlen et al. | 340/995 |
| 5,614,895 | 3/1997 | Ohomori et al. | 340/995 |
| 5,699,255 | 12/1997 | Ellis et al. | 340/995 |

FOREIGN PATENT DOCUMENTS

| | | |
|---|---|---|
| WO 92/ 14215 | 8/1992 | WIPO . |
| WO 92/21001 | 11/1992 | WIPO . |

OTHER PUBLICATIONS

PCT—Notification of Transmittal of the International Search Report, dated Nov. 2, 1995, in International application No. PCT/US95/07859, Application Shields Enterprises, Inc.

"Smart cars. Smart Highways." Collier, W. Clay and Weiland, Richard J. *IEEE Spectrum,* Apr. 1994, pp. 27–33.

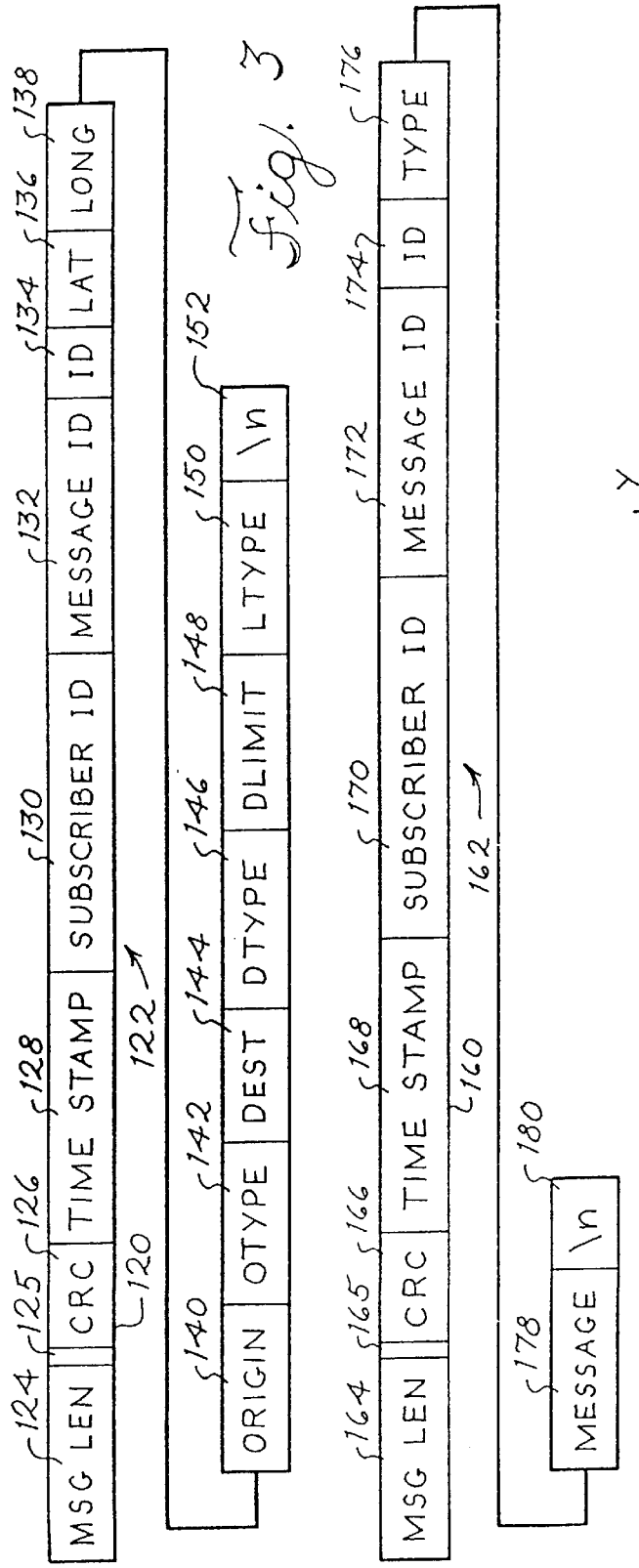
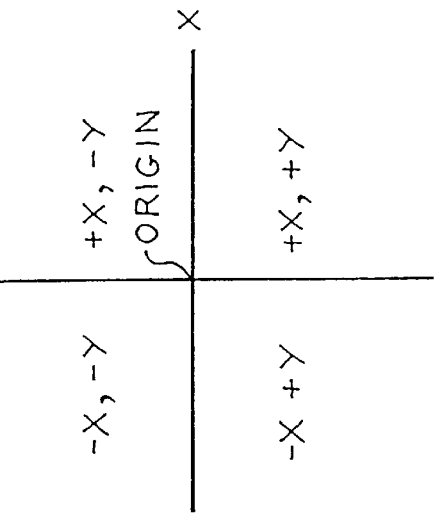
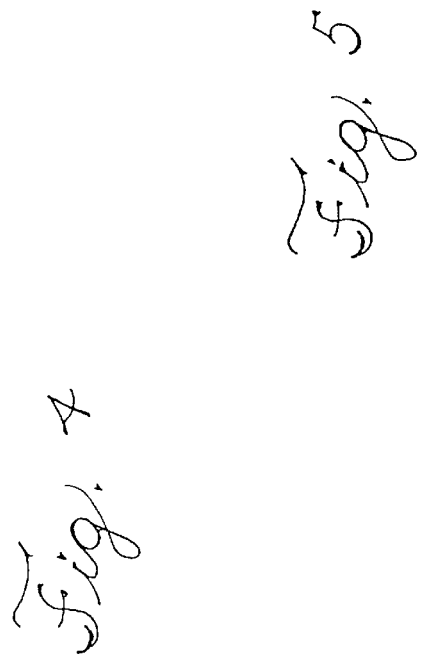
Fig. 3
Fig. 4
Fig. 5

START OUT GOING EAST ON
ROCKWOOD ST TOWARDS
GLENDALE BLVD.
DRIVE 0.1 MILES
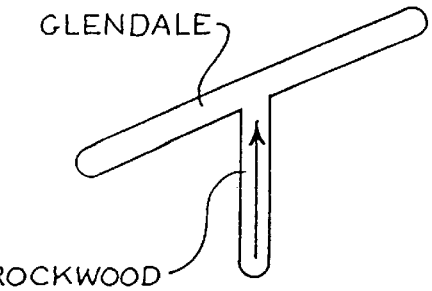
Fig. 6
TURN RIGHT ONTO GLENDALE BLVD.
DRIVE 0.1 MILES
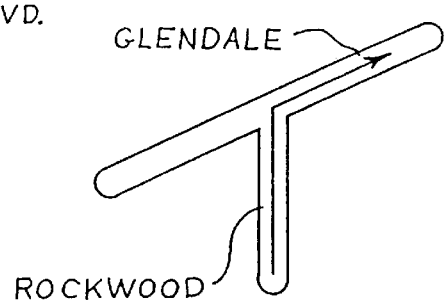
Fig. 7
Fig. 8
TURN SLIGHT RIGHT ONTO
LUCAS AVE
DRIVE 0.2 MILES
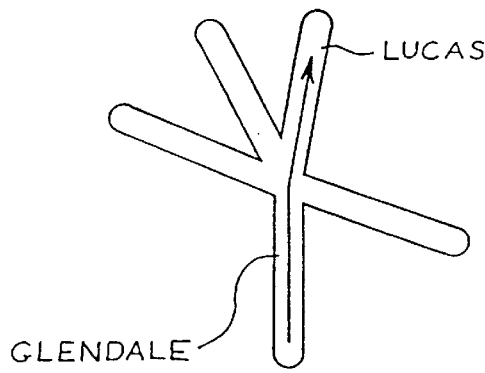

TURN LEFT ONTO EMERALD DR
DRIVE 0.1 MILES.

EMERALD

LUCAS

TURN RIGHT ONTO EMERALD ST.
DRIVE A SHORT DISTANCE TO
YOUR DESTINATION AT 280
EMERALD ST.

EMERALD

EMERALD

MAIN

ELM

BROAD

WHOLE PACKET─{|073|2F39|92D45811|S40620B00159377|9BCA|DUNMIR21109|||||||||MANEUVER=NEXT|ARMS=Y|

*Fig. 13*

|2fc3739b|S40620B00159377|9bca|DUNMIR21109|R|\r\r 5) 0.4 Turn RIGHT onto EMERALD ST. \r Drive a short distance to your destination at 280 EMERALD ST.\r|ARM=EMERALD;EMERALD;1,99;96,-26;-74,-66|

*Fig. 14*

PACKET HEADER ─ {|0495|9588

1ST MESSAGE ─ {|2fc3739b|S40620B00159377|9bca|DUNMIR21109|R|\r\r 5) 0.4 Turn RIGHT onto EMERALD ST. \r Drive a short distance to your destination at 280 EMERALD ST.\r|ARM=EMERALD;EMERALD;1,99;96,-26;-74,-66|

2ND MESSAGE ─ {|2fc3739b|S40620B00159377|9bca|DUNMIR21109|R|\r SEI/EnRoute! Thank you for using SEI/EnRoute!\r\rDatabase Copyright 1992 - 94 Navigation Technologies Corp.\r(Database version wsall0076_2.3.0, SEI/EnRoute Copyright 1993-1994 SEI Information Technology/IDS Software version 1.2)\r|MORE=N|

*Fig. 15*

|078|0A8D|80DC0960|IDSDIVISION|9D89|BOBD|||||||||SESSION=00000000|BURST=N
MAXPKT=1024|¬

*Fig. 16*

|0039|67f1|2ef5d974|IDSDIVISION|9d89|BOBD|E|OK|¬

Fig. 17

|055|800B|80DC0962|IDSDIVISION|9D8B|BOBD|||||||CONFIG=LA.CFG|¬

Fig. 18

|0039|3d8a|2ef5d976|IDSDIVISION|9d8b|BOBD|E|OK|¬

Fig. 19

|119|A4C8|80DC096E|IDSDIVISION|9D98|BOBD|||950 S FLINT RIDGE WAY, ANAHEIM|ADDRESS|2043 N SACRAMENTO, ORANGE|ADDRESS|0|M|ARMS=Y|¬

Fig. 20

|0753|2bc6|2ef5d987|IDSDIVISION|9d98|BOBD|R|\r    About 9.1 miles 20 minutes.\r|¬
|2ef5d987|IDSDIVISION|9d98|BOBD|R|\r\r  1)   0.0  Start out going Northwest on S FLINT RIDGE WAY.   \r         Drive a short distance. |ARM=FLINT RIDGE;WHITE FIR;1,99;-79,-61;24,-96|¬
|2ef5d987|IDSDIVISION|9d98|BOBD|R|\r\r  2)   0.0  Turn LEFT onto E WHITE FIR LN.    \r        Drive 0.1 miles.    |ARM=FLINT RIDGE;WHITE FIR;1,99;79,-61;24,-96|¬
|2ef5d987|IDSDIVISION|9d98|BOBD|R|\r\r  3)   0.1  Turn RIGHT onto S LONE PINE LN.   \r        Drive 0.1 miles.    |ARM=WHITE FIR;LONE PINE;1,99;67,-73|¬
|2ef5d987|IDSDIVISION|9d98|BOBD|R|\r\r  4)   0.2  Turn LEFT onto E SOMERSET LN.  \r       Drive a short distance.    |ARM=LONE PINE;SOMERSET;1,99;-93,-35;38,-92|MORE=Y|¬

Fig. 21

|062|61D6|80DC0975|IDSDIVISION|9D9F|BOBD|||||||MANEUVER=NEXT|ARMS=Y|¬

Fig. 22

```
|0664|449c|2ef5d98a|IDSDIVISION|9d9f|BOBD|R|\r\r  5)    0.2   Turn RIGHT
onto SERRANO AVE.  \r        Drive 0.3 miles.
|ARM=SOMERSET;SERRANO;1,99;98,-18;-97,22;-12,-99|¬
|2ef5d98a|IDSDIVISION|9d9f|BOBD|R|\r\r  6)    0.6   Turn LEFT onto S WEIR
CANYON RD.  \r        Drive 0.8 miles.     |ARM=SERRANO;WEIR
CANYON;1,99;-99,0;-26,-96;97,-21|¬
|2ef5d98a|IDSDIVISION|9d9f|BOBD|R|\r\r  7)    1.4   Turn RIGHT onto the CA-
91 WEST RAMP.  \r        Drive 5.3 miles.     |ARM=YORBA LINDA;CA-91
WEST;1,99;83,-55;2,-99|¬
|2ef5d98a|IDSDIVISION|9d9f|BOBD|R|\r\r  8)    6.7   Take the CA-55 HWY SOUTH
exit.  \r        Drive 0.7 miles.     |ARM=RIVERSIDE;CA-55 SOUTH;1,99;0,-
100;7,-99|MORE=Y|¬
```

Fig. 23

```
|0652|F22E|80DC0978|IDSDIVISION|9DA2|BOBD||||||||MANEUVER=NEXT|ARMS=Y|¬
```

Fig. 24

```
|0652|6dc9|2ef5d98d|IDSDIVISION|9da2|BOBD|R|\r\r  9)    7.4   Take the NOHL
RANCH RD/LINCOLN AVE exit.  \r        Drive 0.2 miles.     |ARM=COSTA
MESA;TUSTIN ST;1,99;-2,-99;-21,-97|¬
|2ef5d98d|IDSDIVISION|9da2|BOBD|R|\r\r 10)    7.6   Turn LEFT onto N TUSTIN
ST.  \r        Drive 1.0 miles.     |ARM=TUSTIN ST;TUSTIN;1,99;-99,-
6;98,15|¬
|2ef5d98d|IDSDIVISION|9da2|BOBD|R|\r\r 11)    8.6   Turn LEFT onto E MEATS
AVE.  \r        Drive 0.4 miles.     |ARM=TUSTIN;MEATS;1,99;-99,3;-4,-
99;99,-11|¬
|2ef5d98d|IDSDIVISION|9da2|BOBD|R|\r\r 12)    8.9   Turn RIGHT onto N
BRECKENRIDGE ST.  \r        Drive a short distance.
|ARM=MEATS;BRECKENRIDGE;1,99;99,3;0,-100|MORE=Y|¬
```

Fig. 25

|062|1595|80DC097B|IDSDIVISION|9DA5|BOBD|||||||||MANEUVER=NEXT|ARMS=Y|⌐

Fig. 26

|0640|638b|2ef5d990|IDSDIVISION|9da5|BOBD|R|\r\r 13)    9.0   Turn RIGHT onto E BRENTFORD AVE.  \r      Drive 0.1 miles.  \r |ARM=BRECKENRIDGE;BRENTFORD;1,99;99,-4;-4,-99|⌐
|2ef5d990|IDSDIVISION|9da5|BOBD|R|\r\r 14)   9.0   Turn LEFT onto N SACRAMENTO ST.  \r      Drive a short distance to your destination at 2043 N SACRAMENTO ST.\r|ARM=BRENTFORD;SACRAMENTO;1,99;-99,0|⌐
|2ef5d990|IDSDIVISION|9da5|BOBD|R|\r          Thank you for using SEI/EnRoute!\r\rDatabase Copyright 1992 - 94 Navigation Technologies Corp.\r(Database version 1ao0104_2.3.0, SEI/EnRoute Copyright 1993-1994 SEI Information Technology/IDS Software version 5.48)\r|MORE=N|⌐

Fig. 27

|121|7372|80DC099C|IDSDIVISION|9DC6|BOBD|||1750 QUEENS RD, LOS ANGELES|ADDRESS|7530 ORANGETHORPE, BUENA PARK|ADDRESS|0|M|ARMS=Y|⌐

Fig. 28

```
|0746|fef2|2ef5d9b8|IDSDIVISION|9dc6|BOBD|R|\r                     About 30.2
miles, 51 minutes.\r|⌐
|2ef5d9b8|IDSDIVISION|9dc6|BOBD|R|\r|\r  1)   0.0  Start out going
Northwest on QUEENS RD towards FRANKLIN AVE.   \r         Drive a short
distance.   |ARM=QUEENS;QUEENS;1,99;-64,76|⌐
|2ef5d9b8|IDSDIVISION|9dc6|BOBD|R|\r|\r  2)   0.1  Turn SLIGHT RIGHT onto
QUEENS RD.    \r          Drive 0.5 miles.    |ARM=FRANKLIN;QUEENS;1,99;4,-
99;95,-30|⌐
|2ef5d9b8|IDSDIVISION|9dc6|BOBD|R|\r|\r  3)   0.5  Turn LEFT onto W SUNSET
BLVD.    \r          Drive 3.5 miles.    |ARM=QUEENS;SUNSET;1,99;-99,5;99,-
6|⌐
|2ef5d9b8|IDSDIVISION|9dc6|BOBD|R|\r|\r  4)   4.1  Turn RIGHT onto the US-
101 SOUTH RAMP.    \r          Drive 24.5 miles.    |ARM=SUNSET;US-101
SOUTH;1,99;92,-37;-2,-99|MORE=Y|⌐
```

Fig. 29

```
|062|EB9C|80DC09A6|IDSDIVISION|9DD0|BOBD||||||||MANEUVER=NEXT|ARMS=Y|⌐
```

Fig. 30

|0802|db71|2ef5d9bb|IDSDIVISION|9dd0|BOBD|R|\r\r 5) 28.6 Take the KNOTT AVE exit. \r Drive 0.1 miles. |ARM=SANTA ANA;ARTESIA BLVD;1,99;77,-63;12,-99|⌐
|2ef5d9bb|IDSDIVISION|9dd0|BOBD|R|\r\r 6) 28.7 Merge onto KNOTT AVE. \r Drive 1.0 miles. |ARM=ARTESIA BLVD;KNOTT;1,99;19,-98;-23,97;-97,-21;97,22|⌐
|2ef5d9bb|IDSDIVISION|9dd0|BOBD|R|\r\r 7) 29.7 Turn LEFT onto ORANGETHORPE AVE. \r Drive 0.5 miles to your destination at 7530 ORANGETHORPE AVE.\r|ARM=KNOTT;ORANGETHORPE;1,99;-99,3;-4,-99;99,-1|⌐
|2ef5d9bb|IDSDIVISION|9dd0|BOBD|R|\r Thank you for using SEI/EnRoute!\r\rDatabase Copyright 1992 - 94 Navigation Technologies Corp.\r(Database version la00104_2.3.0, SEI/EnRoute Copyright 1993-1994 SEI Information Technology/IDS Software version 5.48)\r|MORE=N|⌐

Fig. 31

|104|5F31|80DC09DF|IDSDIVISION|9E08|BOBD|||1855 W KATELLA AVE, ORANGE|ADDRESS|HAPPY|RESTAURANT|100|M|QUERY=POIS|⌐

Fig. 32

|0085|30dd|2ef5d9f4|IDSDIVISION|9e08|BOBD|Q|No of POIs found:00000: : : -, : ,  : |MORE=N|⌐

|105|E9C4|80DC09F6|IDSDIVISION|9E20|BOBD|||1855 W KATELLA AVE, ORANGE|ADDRESS|HUNGRY|RESTAURANT|100|M|QUERY=PCIS|¬

Fig. 33

|0269|523a|2ef5da0c|IDSDIVISION|9e20|BOBD|Q|No of POIs found:00002: : : -
- - , : : ;HUNGRY TIGER SEAFOOD RESTAURANT:6231 MANCHESTER BLVD, BUENA PARK:36:23606:0-0-223-137,4,1:46646:N;HUNGRY BEAR RESTAURANT:2219 N HARBOR BLVD, FULLERTON:36:24034:0-0-459-108,4,2:38570:N|MORE=N|¬

Fig. 34

|105|F245|80DC0A07|IDSDIVISION|9e31|BOBD|||1855 W KATELLA AVE, ORANGE|ADDRESS|BURGER|RESTAURANT|100|M|QUERY=POIS|¬

Fig. 35

|0704|1c86.|2ef5da1d|IDSDIVISION|9e31|BOBD|Q|No of POIs found:00016: : : -
- - , : : ;BREA'S BEST BURGERS:707 S BREA BLVD, BREA:36:23589:0-0-230-190,4,1:38608:N;BURGER KING:959 S COAST DR, COSTA MESA:36:23729:0-0-395-82,4,1:43298:N;BURGER KING:19201 BROOKHURST ST, HUNTINGTON BEACH:36:24237:0-0-779-194,4,2:51444:N;BURGER KING:1236 W IMPERIAL HWY, LA HABRA:36:24406:0-0-453-165,4,2:49052:N;C AND J BURGER:421 E LA HABRA BLVD, LA HABRA:36:24408:0-0-229-139,4,1:50512:N;GEORGE'S BURGERS:601 W LA HABRA BLVD, LA HABRA:36:24429:0-0-908-180,4,1:52112:N;IMPERIAL BURGERS:241 E IMPERIAL HWY, LA HABRA:36:24435:0-0-919-268,4,-:46502:N;T AND S BURGER:650 W LA HABRA BLVD, LA HABRA:36:24484:0-0-908-180,4,2:52112:N|MORE=Y|¬

Fig. 36

|055|A5C1|80DC0A0B|IDSDIVISION|9E34|BOBD||||||||MANEUVER=NEXT|⌐

Fig. 37

|0643|833e|2ef5da1f|IDSDIVISION|9E34|BOBD|Q|IN-N-OUT BURGER:7926 VALLEY VIEW ST, LA PALMA:36:24514:0-0-1210-243,4,2:50592:N;BURGER KING:245 N CITRUS ST, ORANGE:36:26021:0-0-829-124,4,1:6189:N;IN-N-OUT BURGER:825 W CHAPMAN AVE, PLACENTIA:36:26314:0-0-959-137,4,1:24590:N;BURGER KING:2850 S BRISTOL ST, SANTA ANA:36:26542:0-0-396-111,4,1:36418:N;BURGER KING:601 E DYER RD, SANTA ANA:36:26543:0-0-797-207,4,1:35830:N;BURGER KING:13431 NEWPORT AVE, TUSTIN:36:26864:0-0-871-69,4,1:28304:N;BOB'S BURGER:13891 BEACH BLVD, WESTMINSTER:36:27177:0-0-199-315,4,2:40114:N;IN-N-OUT BURGER:6292 WESTMINSTER BLVD, WESTMINSTER:36:27186:0-0-1197-216,4,2:49140:N|MORE=N|⌐

Fig. 38

ELECTRONIC NAVIGATION SYSTEM AND METHOD

REFERENCE TO RELATED APPLICATIONS

The present application is a continuation of Ser. No. 08/494,198, filed Jun. 23, 1995, now U.S. Pat. No. 5,808, 566, which was a continuation-in-part of Ser. No. 08/265, 094, filed Jun. 24, 1994, now U.S. Pat. No. 5,543,789, the entire contents of which are incorporated by reference herein.

REFERENCE TO MICROFICHE APPENDIX

Included with this specification is a microfiche appendix including 3 sheets of 283 total frames.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The invention relates generally to a system and method for providing route guidance and tracking information and other information from a base unit to a mobile unit over wireless, wireline, or optical devices.

The invention more particularly relates to an apparatus and method for providing to a mobile unit route guidance and tracking information and other information which has been calculated and/or stored at a base unit in response to a query from the mobile unit.

Systems have already been developed which provide geographical or position-dependent information to a mobile user. Such systems are generally installed in an automobile or other vehicle. These systems generally include an on-board geographic database which may be accessed to determine geographic information, such as locations of points of interest, directions to points of interest, and directions between a specified origin and a destination. An on-board computer calculates route guidance information using data from the database in response to user inputs.

Such systems are known as autonomous route guidance systems since they are independent and self-contained. The systems generally include a geographic database, positioning sensors, and a computer including a keyboard and display. The geographic database is a representation of a region or metropolitan area and may include, for example, street names, navigation attributes, such as turn restrictions and one-way streets., street addresses, and points of interest, such as airports, restaurants and museums. The positioning sensors may determine geographic position from RF (Radio Frequency) triangulation or in response to signals from, for example, GPS (Global Positioning System), LORAN C or other similar positioning systems, and from motion and direction detectors. The computer calculates route guidance information in response to inputs from the other system components as well as from operator input. The route guidance information is provided to the user in the form of navigational text or map graphics.

Autonomous route guidance systems have many drawbacks, however, which have prevented their widespread use. Because the system is autonomous and has an on-board database, the system must include large storage capabilities for storing all of the data which form the database. Technologies such as CD-ROM have allowed storage of an entire database but require still a tradeoff between cost and fast, efficient data access.

Another problem with autonomous route guidance systems is maintenance and currency of the database. As new streets are built, or as old streets are reconfigured, as businesses and other points of interest open and close, the database on CD-ROM or other media becomes out of date. In addition, when a database is compiled, it may include errors which are then replicated in the many copies provided to users. These errors may require correction in the user copies by replacing those database copies. Moreover, incorrect or outdated information in the database can lead to errors when calculating routes. When an out-of-date database does not include the information that a particular roadway is closed, the system may be unable to calculate an alternate route.

Autonomous route guidance system providers may improve the accuracy of the system by providing occasional database updates to users. However, distribution of the database, in a medium such as CD-ROM or floppy disk, to remotely located mobile users may be difficult. In addition, the media themselves are expensive since they may generally be used only a single time.

Other aspects of such prior art autonomous route guidance systems add to their cost and inconvenience. Because the systems are autonomous, they must include all components, including the computer, the database and the position sensor. Using present technology, such a system is too heavy and too large to be readily transported by an individual. In addition, the complete system has power requirements which make battery operation impractical. As a result, autonomous route guidance systems have been limited to installation in automobiles or other vehicles which can accommodate the size and power requirements of such a system. The current best price for a complete autonomous route guidance system is substantial. This includes only the cost for a single, dedicated autonomous route guidance system.

Another type of route guidance system has been tested in Europe using beacons to provide a guidance signal to on-board equipment. The system directs the user to travel from beacon to beacon, creating a stepwise path between an origin and a destination because of the fixed locations of the beacons. The navigational information thus provided forms a generally inefficient routing path from origin to destination. In addition, such a system does not provide the capability to query a database for information about nearby points of interest and other geographical information.

Therefore, there is a need for a routing and information system that continually provides access to up-to-date, correct geographic information by a remote user. There is a further need for a routing and information system which can be implemented on lightweight, portable devices for easy, convenient transportation and use. There is a further need for a routing and information system which is independent of any particular hardware configuration and which may be implemented on any suitably equipped data processing apparatus, such as a desktop personal computer, a laptop computer, a personal digital assistant or even a pager. There is a further need for a routing and information system which provides communication between mobile units and a base unit over any available channel, including wireless, wireline, and optical channels. There is a still further need for a data communication protocol for providing accurate, reliable communication in such a system, independent of hardware configuration and in a compact form.

SUMMARY OF THE INVENTION

An object of the invention is to provide a method and system for transmitting route guidance and other information from a base unit to a remote unit in a compact form.

Another object of the invention is to provide a method and system for transmitting route guidance and other information from a base unit to a remote unit in a language independent form such that the remote unit can provide the information to a user in any language or form desired by the user at the remote unit.

Another object of the invention is to provide a method and system for transmitting route guidance and other information from a base unit to a remote unit in which the amount of information available at a remote unit can be expanded by providing the remote unit with information from the base unit which is not adequately covered by any databases on-board the remote unit.

The invention provides a method and system for providing route guidance and other information from a base unit to a remote unit in response to a request from the remote unit. A query is formatted at the remote unit, the query including the request, and is transmitted from the remote unit to the base unit. Requested route guidance information is calculated at the base unit in response to the query, using a large up-to-date database located at the base unit. A response to the query is formatted at the base unit, the response including route guidance information. The response is then transmitted from the base unit to the remote unit for display.

The transmission is made in a compact form through the use of maneuver arms and combined maneuver arms and through the use of tokenized forms. These tokenized forms represent a large amount of textual information by one or several alphanumeric characters.

A maneuver arm represents a road at an intersection, for depiction on a display, by one or two endpoint coordinates. If two intersections are sufficiently close together, a first set of maneuver arms for one intersection and a second set of maneuver arms for the other intersection are combined to produce a combined set of endpoints for transmission in a compact form to depict the first set of maneuver arms and the second set of maneuver arms on a common display.

The tokenized forms are expanded at the remote unit into textual driving instructions for each of one or more languages. In addition, the amount of information available at a remote unit can be increased by providing the remote unit with information from the base unit which is not adequately covered by any databases on-board the remote unit.

Other objects, features, and advantages of the invention will be apparent from the detailed description set forth below.

BRIEF DESCRIPTION OF THE DRAWINGS

The features of the invention are set forth with particularity in the appended claims. The invention, together with further objects and advantages thereof, may be further understood by making reference to the following description taken in conjunction with the accompanying drawings, wherein:

FIG. 3 is a diagram illustrating a data communication protocol for communicating data from a mobile, or remote, unit to a base unit in accordance with the invention and which is used in conjunction with the system of FIG. 1 and the method of FIG. 2;

FIG. 4 is a diagram illustrating a data communication protocol for communicating data from a base unit to a mobile unit in accordance with the invention and which is used in conjunction with the system of FIG. 1 and the method of FIG. 2;

FIG. 5 is a diagram illustrating a suitable sign convention for maneuver arm endpoint coordinates;

FIGS. 6 to 10 show examples of maneuver arms displays in a remote unit;

FIGS. 11 to 14 illustrate data that is transferred between a remote unit and a base unit in the example of FIGS. 6 to 10;

FIGS. 15 to 38 illustrate additional examples of data transferred between a remote unit and a base unit;

DETAILED DESCRIPTION OF PREFERRED EMBODIMENTS

Overview

Figure 1:
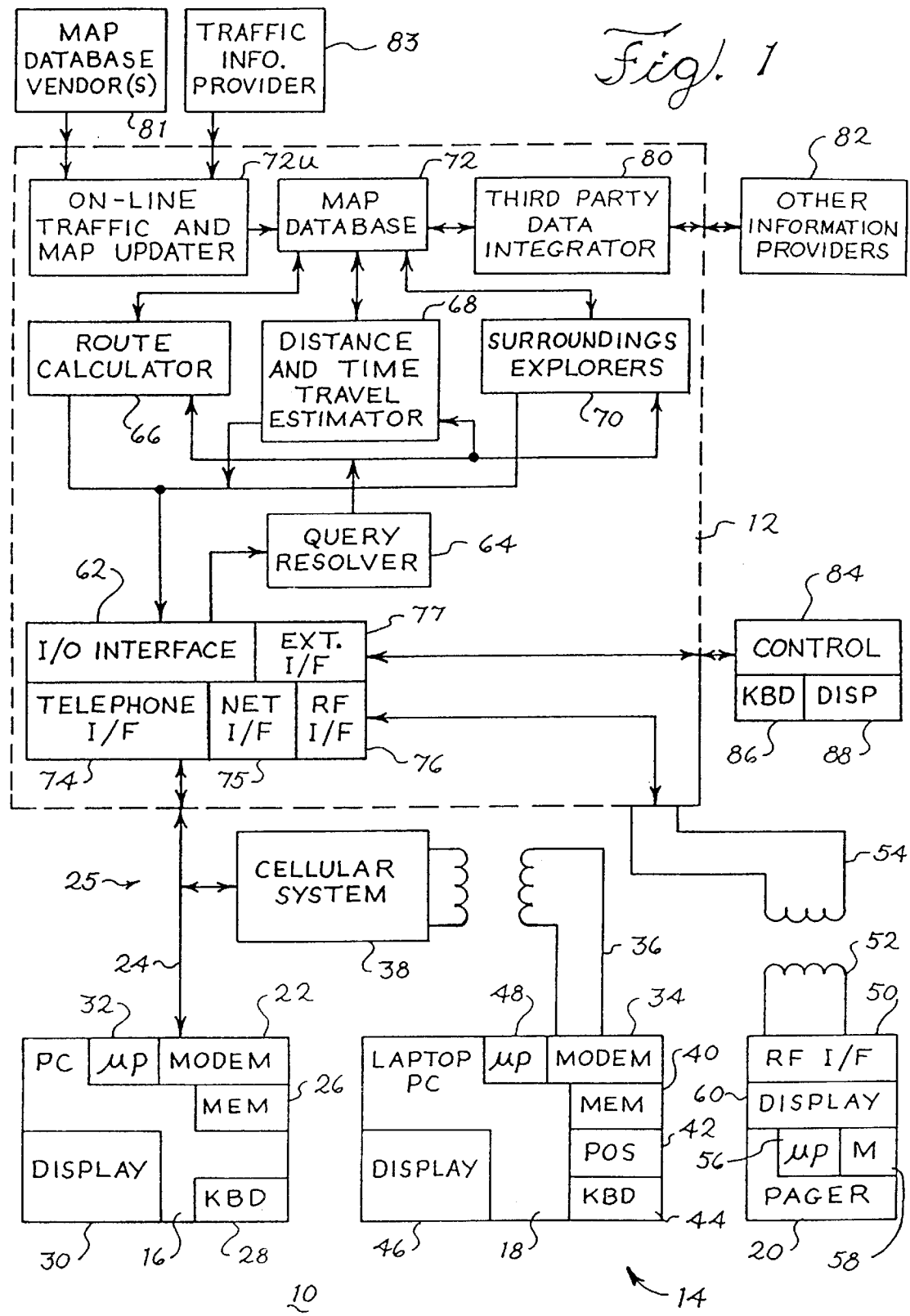
FIG. 1 is a functional block diagram illustrating a system of the invention.

The invention provides a method of providing route guidance information and other information from a base unit to a mobile unit in response to a request from the mobile unit. The method comprises the steps of formatting a query at the mobile unit, the query including the request, communicating the query from the mobile unit to the base unit, and calculating route guidance information at the base unit in response to the query. The method further comprises the steps of formatting a response to the query at the base unit, the response including route guidance information, and communicating the response from the base unit to the mobile unit. The guidance information may include navigation instructions from an origin to a destination, information about one or more points of interest within a particular region, or other geographically referenced information.

The invention further provides a system for communicating routing information between a base unit and a mobile unit. The system comprises an input means at the mobile unit for providing an origin and a destination. The system further comprises a calculating means at the base unit for calculating a route between the origin and the destination. The system still further comprises communication means for communicating the origin and the destination from the mobile unit to the base unit and for communicating the route from the base unit to the mobile unit. The routing information may include navigation instructions from an origin to a destination, information about one or more points of interest within a particular region, or other geographically referenced information.

The invention still further provides a method of providing routing information to a mobile unit. The method comprises the steps of providing an origin and a destination from the mobile unit to a base unit, the base unit located remotely from the mobile unit. The method further comprises the steps of calculating at the base unit a route between the origin and the destination, and providing the route to the mobile unit.

The invention still further provides a system for providing route guidance information to a remote location from a central location. The system comprises a mobile unit including an input means for providing at least a route destination and an output means for providing an indication of the route guidance information. The system further comprises a first transmission means at the mobile unit for transmitting destination data and origin data from the mobile unit, the destination data being indicative of a route destination and the origin data being indicative of a route origin. The system still further comprises a base unit at the central location. The base unit includes a first receiving means for receiving the destination data and the origin data from the first transmission means, a calculating means coupled with the receiving means for calculating a route to the route destination from a route origin responsive to the destination data and the origin data, and a second transmission means for transmitting routing data, the routing data being indicative of the route. The system still further comprises a second receiving means at the mobile unit for receiving the routing data from the second transmission means, the second receiving means being coupled with the output means for providing the route guidance information to the input means responsive to the routing data.

The invention also provides a system and method for providing geographically referenced information from a base unit or server to a mobile unit. The mobile unit may be a transportable device such as a laptop computer or personal digital assistant (PDA), or may be a desktop personal computer or any other device permitting data entry and display, printing, or sounding of the provided information.

The mobile unit communicates with the base unit using any available communication system, such as land line telephone link, cellular telephone or radio frequency transmission. Queries are communicated from the mobile unit to the base unit. The query requests route guidance information, information about a point of interest or other geographical information. The query is formatted in a specified protocol. The base unit communicates responses to queries, the responses also being formatted in a specified protocol. The responses may include, for example, textual navigational directions and/or maneuver arms showing graphical representations of street intersections and the calculated route through the intersection. Transmitting only a representation of the intersection, rather than all geographical features around the intersection, allows the response, including the maneuver arms, to be transmitted over a low bandwidth channel. The invention operates independently of the communication system and is adaptable to any system. The invention allows support for many different mobile unit platforms, taking advantage of each platform's capabilities while retaining as much system-level look and feel consistency as possible.

The base unit includes a geographical database, such as the Navigation Technologies Corp. navigable map database. The geographical database stores a variety of geographical and position-oriented attributes, such as street addresses, turn restrictions and points of interest. The points of interest are preferably organized according to different parameters, including point of interest type, such as "restaurant" or "museum;" point of interest name; city; driving distance; and/or driving time. The base unit further includes a server for receiving queries from one or more mobile units, resolving ambiguities in the queries, determining a response to a query, and accessing the geographical database as needed. The server formats a response to the query and communicates the response to the mobile unit.

In a first mode of operation, an origin and a destination are entered at the mobile unit. The origin and/or the destination may be in the form of a street address, an intersection of two streets, or a point of interest previously identified in the geographical database. The origin and destination are communicated from the mobile unit to the base unit. The base unit calculates a route between the specified origin and destination. The routing information is communicated from the base unit to the mobile unit where it is displayed by the mobile unit. The display can be a graphical display, showing map portions and providing travel directions along with a display of highway signs and other information. The display can include textual information providing travel directions. The mobile unit may supply a digitally synthesized voice which audibly presents the travel directions to the user. In some applications, the display is stylized to display additional information to the user or to display information in a more realistic or more informative form.

For example, the display can indicate in graphical form whether an on or off ramp is a tight or gentle turn by displaying stylized ramps. Shapepoints, that is, points which more accurately depict the physical shape of a road, can be generated either by the base unit or by a remote unit.

In a second mode of operation, the mobile unit formulates a query requesting information about points of interest within a specified distance of an origin. The origin may be specified by street address, intersecting streets, by geographic position or by reference to a point of interest. The query is communicated from the mobile unit to the base unit. The base unit uses the geographical database to formulate a response. The response is communicated from the base unit to the mobile unit for display to the user.

In a third mode of operation, a mobile unit provides information specifying its location to the base unit. A control unit requests tracking information about the mobile unit from the base unit. The control unit may be, for example, another personal computer, coupled to the base unit through an external interface, either directly or through a communications network. The base unit provides to the control unit tracking information including the current location of the mobile unit with respect to the street network and the route covered by the mobile unit.

The invention further provides a protocol for communicating a query from the mobile unit to the base unit and for communicating a response from the base unit to the mobile unit. The protocol allows transmission of variable length messages, as required by the individual mobile unit or communication link. The protocol includes error checking, time stamping and subscriber information.

The protocol further includes information specifying origin and destination, for a query, and message type and message contents, such as route information, for a response.

The invention thus provides geographically referenced information from a base unit to a mobile unit, the mobile unit needing only data entry and display devices and a communications link. An advantage of the invention is that the invention provides this capability in a mobile unit which does not require on-board database storage or position finding equipment at the mobile unit.

A further advantage of the invention is that the invention provides a mobile unit with access to a larger, more comprehensive database. For example, prior art CD-ROM-based databases are limited to 600 MB of storage which may be sufficient to store map information for only a single metropolitan region. In contrast, the invention allows the mobile unit to access map information for many metropolitan regions or an entire nation, as well as other information, such as on-line yellow page information or news, weather and/or traffic advisory information, which may be provided by third-party information providers. Such information can be provided on a geographic specific basis. A still further advantage of the invention is that the invention permits automatic, real time database updates by maintaining the database only at the base unit, avoiding the need to distribute database updates to the mobile units.

A further advantage of the invention is that the invention provides a method for communicating requests for routing information and responses including routing information in which the method is independent of specific hardware. A further advantage of the invention is providing a system which can be implemented using any commonly available hardware devices, including laptop computers, personal digital assistants and other transportable units communicating via wireless, wireline, and/or optical systems.

A still further advantage of the invention is efficiently conveying complex information, including graphical information, over communication channels having a limited bandwidth using data compression and a novel protocol, to be described in detail below. This allows a system in accordance with the invention to dynamically transmit selected map portions for display on a capable mobile unit. The geographical information may be saved at the mobile unit for later retrieval and display, without having to again access the base unit.

System Description

FIG. 1 is a functional block diagram of a system 10 embodying the invention. The system 10 includes a base unit 12 and a plurality 14 of remote units arranged to communicate with the base unit 12. The base unit 12 includes a central processing unit (CPU) and a program memory which stores programs for performing the functions described below. IBM RS/6000 series computers are suitable for such a purpose; however, many other computer systems can be used. The plurality 14 of remote units may include, for example, a desktop personal computer (PC) 16 such as IBM compatible PCTs and the Apple Newton, a laptop personal computer (PC) 18, or a pager 20. Suitable program languages include ANSI C and MS-Visual Basic.

The plurality 14 of remote units may include any number of mobile units. The base unit 12 is preferably located at a single, central location. One remote unit may be permanently located at a single site, such as desktop personal computer 16. Another remote unit may be mobile or transportable, such as laptop personal computer 18 or pager 20. As used herein, the term "mobile unit" includes both remote units which may be permanently located at a single site and remote units which are mobile or transportable.

Communications between the base unit and the remote units are packetized. A packet contains one or more messages.

The desktop personal computer 16 is an example of one type of mobile unit which may be included in the system 10. The desktop personal computer 16 preferably includes a modem 22, a memory 26, a keyboard 28, a display 30 and a microprocessor 32. The modem 22 is adapted to be coupled to a telephone line 24. The telephone line 24 is in turn coupled to the commercial telephone system 25. The modem 22 may be, for example, a serial (dial-up line) modem such as a modem compatible with an AT command set which is built into the desktop personal computer 16, a stand-alone modem, or a PCMCIA modem. Alternatively, the modem may be for use with a specialty wireless transmission network such as ARDIS, CDPD (cellular digital packet data) or RAM. Still further, the modem may be of a type custom designed for the desktop personal computer 16. The modem 22 forms a, transmission means at the mobile unit for transmitting the origin and the destination and a receiving means at the mobile unit for receiving the responses, including the route, from the base unit 12.

The microprocessor 32 responds to program instructions and data stored in the memory 26. To activate the system 10, a user manipulates the keyboard 28 to formulate a request. The request may, for example, seek the route between an origin and a destination. The keyboard 28 thus provides an input means at the mobile unit for providing an origin and a destination. The desktop PC 16, under control of a program of instructions stored in the memory 26, conveys the request over the telephone line 24 to the base unit 12. The base unit 12 formulates a response to the request and conveys the response over the telephone line 24 to the desktop PC 16. The response to the request is displayed on the display 30. The display 30 thus forms an output means at the mobile unit for providing an indication of the route provided in the response. In addition, the response may be stored in the memory 26 for later retrieval and display. The memory 26 thus provides a storage means at the mobile unit for storing the route communicated from the base unit.

The laptop personal computer 18 is another example of a mobile unit which can be used in the system 10. The laptop PC 18 includes a modem 34, a memory 40, a position locator 42, a keyboard 44, a display 46 and a microprocessor 48. The modem 34 is coupled to an antenna 36 for sending and receiving cellular telephone calls in conjunction with the cellular telephone system 38, which is a portion of the commercial telephone system 25. The modem 34 may be, for example, any of the modem types described in conjunction with the modem 22 of the desktop personal computer 16.

The microprocessor 48 operates in response to program instructions and data stored in the memory 40. The position locator 42 provides the geographical position of the laptop PC 18. For example, the position indicator 42 may perform radio frequency (RF) triangulation or may be responsive to GPS (Global Positioning System), LORAN C signals or other satellite positioning systems for providing latitude and longitude positioning information. The position locator 42 thus provides a position determining means for determining the geographical position of the mobile unit. The laptop PC 18, in response to the program instructions stored in the memory 40, provides a request over the commercial telephone system to the base unit 12. The request may be, for example, for the route between an origin and a destination. The origin may be specified either by manipulating the keyboard 44 or by providing the latitude and longitude information produced by the position locator 42. The base unit 12 provides a response to the request to the laptop PC 18. The response is displayed on the display 46.

The pager 20 provides another example of a remote unit which can be used in the system 10. The pager 20 includes an RF interface 50 coupled to an antenna 52 for receiving RF signals from an antenna 54 coupled to the base unit 12. The pager 20 further includes a microprocessor 56 responsive to program instructions and data stored in a memory 58. In response to information transmitted from the base unit 12 and received at the antenna 52, the microprocessor 56 displays information, such as geographical directions, on a display 60.

In another mode of operation, one mobile unit, such as the desktop personal computer 16, may track another mobile unit, such as the laptop personal computer 18, using the system 10. A user of the desktop personal computer 16 may manipulate the keyboard 28 to request route guidance information such as tracking information.

The request is transmitted over the telephone line 24 to the base unit 12. The base unit 12 formulates a response based on the geographic position information provided by the position locator 42 of the laptop PC 18. The response is transmitted over the telephone line 24 to the desktop personal computer 16 for display on the display 30.

Thus, the system 10 provides geo-referenced information over, for example, wireless and wireline devices to mobile and remote users. It is understood that the communications technologies and the mobile units illustrated in FIG. 1 may be combined in ways other than those illustrated in FIG. 1. For example, the desktop personal computer 16 may include an RF interface such as the RF interface 50 of the pager 20. Similarly, the modem 34 of the laptop PC 18 may be adapted for coupling directly to a telephone line such as telephone line 24. In addition, other types of mobile units, such as personal digital assistants (PDAs), may be included in the system 10. Moreover, mobile units may access the base unit indirectly by communicating directly with a third-party information provider, such as Prodigy™, which in turn conveys queries to and responses from the base unit 12. In accordance with the invention, the invention operates independently of particular hardware configurations of the plurality 14 of remote units and of the communications system.

The base unit 12 includes an I/O interface 62, a query resolver 64, a route calculator 66, a distance and time travel estimator 68, a surroundings explorer 70, a map database 72, an on-line traffic and map updater 72U, and a third-party data integrator 80. The I/O interface 62 includes a telephone interface 74 for coupling the base unit 12 to the commercial telephone system 25 including the telephone line 24. The I/O interface 62 further includes an RF interface 76 for coupling the base unit 12 with RF communication devices such as an antenna 54. The I/O interface 62 and the modem 22 thus provide a communication means for communicating an origin and a destination from the desktop personal computer 16 to the base unit 12 and for communicating a route from the base unit 12 to the desktop personal computer 16. The I/O interface 62, the modem 34 and the antenna 36 provide a communication means for communicating the origin and the destination from the laptop personal computer 18 to the base unit 12 and for communicating the route from the base unit 12 to the laptop personal computer 18.

The I/O interface 62 may further include a network interface 75 for coupling the base unit 12 to one or more wireless or wireline communication networks such as CDPD (cellular digital packet data), TCP/IP (transmission control protocol/Internet protocol), ARDIS or RAM. The I/O interface 62 may further include an external interface 77 for coupling the base unit 12 to a control unit 84. The control unit 84 provides an external link to the base unit 12 and may be, for example, a personal computer coupled over a wireless or wireline network or a directly connected terminal. The control unit 84 may include, for example, a keyboard 86 and a display 88. The control unit 84 may request tracking information about the location of one or more mobile units. For example, a mobile unit may be located in an armored vehicle transporting valuables along a specified route. The control unit may receive tracking information from the base unit and, if the mobile unit in the armored vehicle varies from the specified route by a predetermined amount, sound an alarm or trigger some other action.

The I/O interface 62, including the telephone interface 74 and the RF interface 76, provide a means for coupling the base unit 12 with communications media such as the commercial telephone system and other wireline and wireless devices. The I/O interface 62 thus receives queries from the plurality 14 of remote units and transmits the responses from the base unit 12 to the plurality 14 of remote units. The I/O interface 62 therefore provides a receiving means at the base unit for receiving the origin and destination and a transmitting means at the base unit for transmitting the route to a mobile unit.

The query resolver 64 receives the request from the I/O interface 62. When a request is entered at one of the plurality 14 of remote units, a mistake may be made.

For example, in manipulating the keyboard 44 of the laptop personal computer 18, the user may have entered. "O'HAIR," intending to enter "O'HARE," indicating O'Hare Airport. Other ambiguities may be in the format of the address provided, in the latitude and longitude of the position provided, or in the definition of cross streets The function of the query resolver 64 is to resolve such ambiguities in the query at the base unit 12 and convey the query for further processing.

After the query resolver, the query is routed to the route calculator 66. In a manner well known in the art, the route calculator 66 determines a route between a specified origin and destination using the map database 72. The map database 72 may be, for example, the navigable map database maintained by Navigation Technologies Corp. The map database 72 preferably includes an accurate, complete, and up-to-date representation of geographic information such as addresses, street names, navigation attributes (including turn restrictions, one-way streets, physical dividers, relative heights, freeway sign text, and so forth), as well as point of interest categories, such as parks, schools, hospitals, restaurants, and golf courses associated with the geographic information. The on-line traffic and map updater 72U receives updating information from map database vendor(s) 81 and traffic information providers 83 and maintains map database 72 current.

In determining the route, the route calculator 66 preferably takes into account routing restrictions such as toll road avoidance, turn restrictions at a specified time of day, and other restrictions. Such routing restrictions may be specified by an operator at the base unit 12 in response to a temporary condition or may be added to the map database 72 when the restrictions become nationally available. The route calculator 66 thus forms a calculating means at the base unit for calculating a route between the origin and the destination. The map database may be divided into geographic areas such as metropolitan areas. Providing the route calculation function in the base unit 12 reduces the data storage and data processing requirements for the remote units. In certain applications, however, it may be desirable to provide the remote units with a limited route calculation function.

After a route has been calculated, the route is conveyed from the route calculator 66 to the I/O interface 62. The I/O interface 62 formats a response to the query. The response includes the route guidance information determined by the route calculator 66. The I/O interface 62 then communicates the response from the base unit 12 to the mobile unit which originally requested the information.

If the query requests a distance or a time of travel, the query is forwarded to the distance and time travel estimator 68. The distance and time travel estimator 68, in response to the query and using the map database 72, formulates a response to the query. The response is conveyed from the distance and time travel estimator 68 to the I/O interface 62. The response is formatted at the I/O interface 62 and communicated from the base unit 12 to the mobile unit which originally requested the information.

If the query requests information about points of interest in the area surrounding an origin, the query is conveyed to the surroundings explorer 70. The surroundings explorer 70 provides an optimized method for searching for points of interest satisfying specified criteria or parameters such as time or distance. For example, the surroundings explorer 70 may locate all McDonald's™ restaurants within a specified driving distance or driving time of a specified origin, or it may locate the McDonald's™ restaurant nearest the specified origin. The origin and search parameters are specified in the query received from the mobile unit. In response to the query, the surroundings explorer 70 accesses the map database 72 and searches outward from the specified origin. The surroundings explorer 70 analyzes paths in the map database 72 over which a mobile unit, in a car for example, could legitimately travel. The surroundings explorer 70 examines the associated point of interest information for entries satisfying the specified search parameters. The surroundings explorer 70 thus determines which points of interest satisfy the query. The information is then conveyed from the surroundings explorer 70 to the I/O interface 62 and a response is formatted. The response is then communicated from the base unit 12 to the remote unit which requested the information.

The third-party data integrator 80 provides additional data such as on-line yellow pages information or news, weather, and/or traffic advisory information for responding to queries from a mobile unit. The additional data are preferably received from other information providers, illustrated in FIG. 1 as functional block 82.

The additional data may also be added directly to and located within the map database 72. The additional data may be supplied external to the base unit 12 via any known data communications network.

The functions performed by the base unit 12, as described above and illustrated in the functional block diagram of FIG. 1, are performed in a data processing system. The data processing system may be in one or more units and include a processor for executing program instructions, a memory for storage of the program instructions and data such as the map database 72. The data processing system further includes other equipment such as digital logic for implementing the I/O interface 62 for receiving queries and sending responses. The data processing system may include a display and a keyboard as an operator interface.

Figure 2:
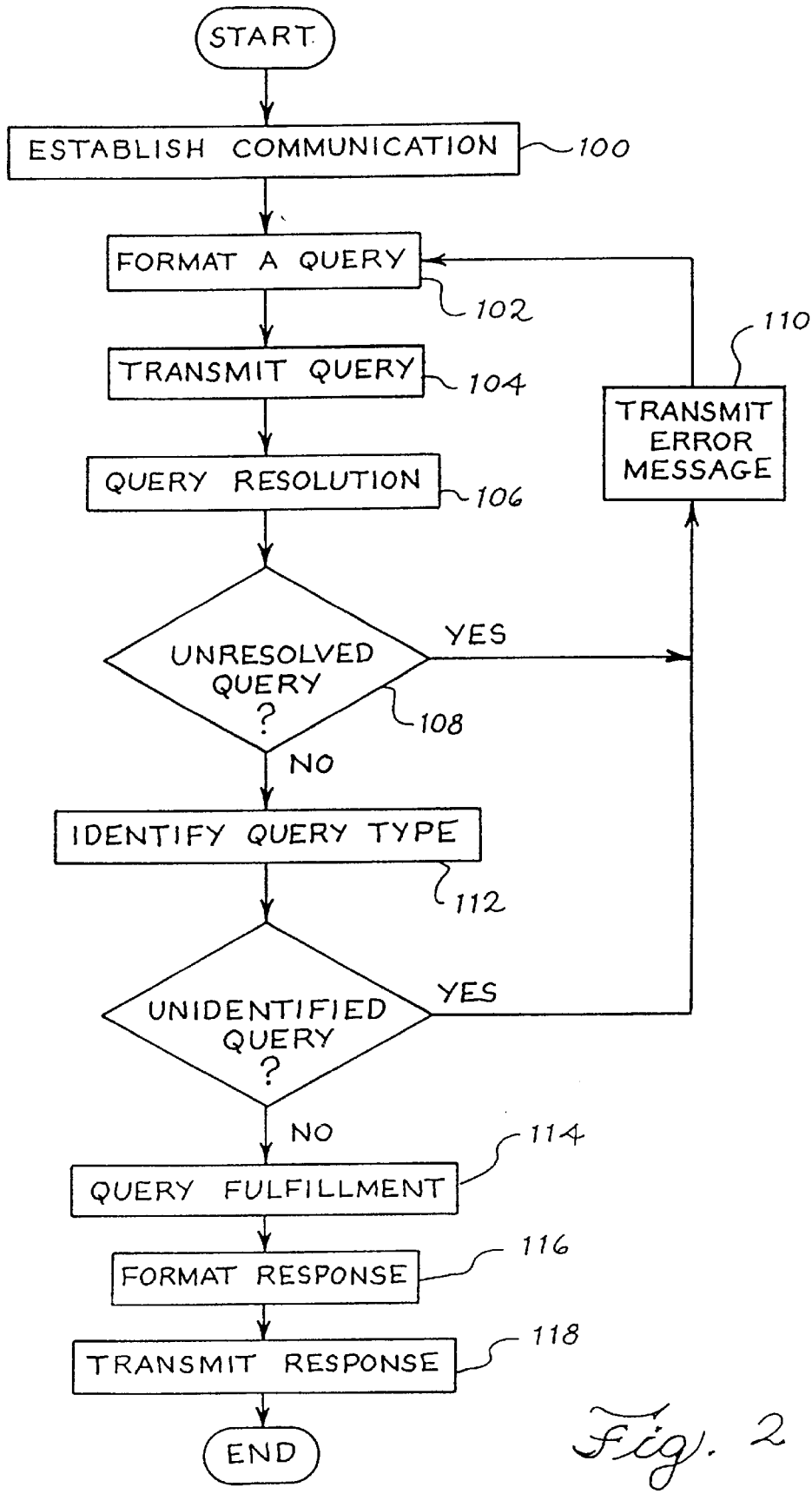
FIG. 2 is a flow diagram illustrating a method of the invention.
Figure 9:
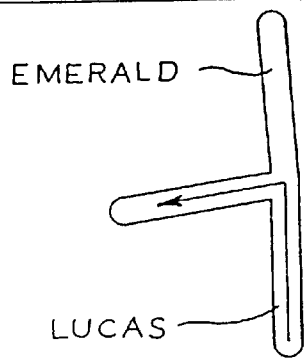
Figure 10:
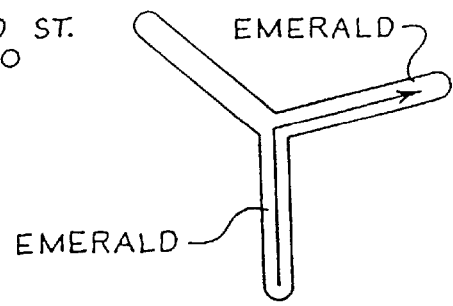

FIG. 2 is a flow diagram illustrating a method of the invention. The method begins at step 100 where communication is established between the mobile unit and the base unit 12. Performance of this step is largely dependent on the specific implementation of both the base unit 12 and the mobile unit. For example, with reference to FIG. 1, the desktop personal computer 16 would establish communications using the modem 22 to place a telephone call over the telephone line 24 to the base unit 12. The telephone interface 74 of the base unit 12 and the modem 22 would establish communication in a manner well known in the art. Similarly, the laptop personal computer 18 would establish communications with the base unit 12 by completing a telephone call through the cellular telephone system 38. However, the basic operation of the invention is independent of the particular hardware and communication channels employed.

The method continues at step 102, in which a query is formatted at the remote unit. The query is formatted in accordance with the protocol of the invention, to be described in further detail below in conjunction with FIG. 3. The query comprises a serial stream of data and control bits. The control bits, for example, identify the remote user originating the query. The data bits specify the precise request being made of the base unit. For example, the data bits may specify an origin point and a destination point, from which the route calculator 66 (FIG. 1) of the base unit 12 is to calculate the route. Certain communications transport protocols, specific to the particular hardware implementation of the system 10, may prepend or append characters or other control bits to the control and data bits which form the query. For example, the modem 22 of the desktop PC 16 may include handshaking bits or signals to be used by the telephone interface 74 of the base unit 12 for processing the query. At step 104, the query is transmitted from the mobile unit to the base unit 12.

The method continues at step 106, where ambiguities in the query are resolved by the query resolver 64 (FIG. 1). Ambiguities may be in the form of spelling errors in the identification of an origin or a destination, an inconsistent latitude or longitude specification, and the like. At step 108, if the query resolver 64 cannot resolve the ambiguity, an error message may be communicated from the base unit to the remote unit at step 110, and the query must be repeated.

The method continues at step 112, where the query type is identified. The query may be one of several different types, including a route query, a point of interest query, a language query, or a metro area query.

A route query asks the base unit 12 to identify a route between a specified origin point and a specified destination point. A route query includes the origin and the destination. A point of interest query requests a list of points of interest which satisfy specified criteria. For example, a point of interest query might request a list of all restaurants of a specific type, such as McDonald's™, within a specified distance or a specified driving time of a specified origin. A language query requests a list of available languages for display of information at the mobile unit or specifies the language (such as English or Dutch) in which the routing information is to be displayed at the remote unit. Such language queries are not needed if the language independent mode (to be described below) is being used. A metro area query requests a list of available metropolitan areas or specifies the metropolitan area within the map database 72 (FIG. 1) to be used for responding to the query. For example, a query which has as its origin "77 W. Chestnut Street" in Chicago must specify the Chicago metropolitan area rather than, for example, the Cincinnati metropolitan area, in order to prevent confusion. If a query cannot be identified, an error message is generated at step 110 and the query must be repeated. After the query type has been determined at step 112, the query is routed to, for example, the route calculator 66, the distance and travel estimator 68, and/or the surroundings explorer 70 (FIG. 1) for processing.

The method continues at step 114, where the query is fulfilled. For example, if the query requested routing information between an origin and a destination, the route calculator 66, operating in conjunction with the map database 72, calculates a route between the origin and the destination. Similarly, if the query was a point of interest query, the surroundings explorer 70 will determine points of interest which satisfy the query.

The method continues at step 116, where the response to the query is formatted. The response is formatted in accordance with a data communications protocol to be described in detail in conjunction with FIG. 4. The formatted response includes control and data bits. The control bits specify information such as the mobile unit which initiated the request. The data bits specify the information, such as route guidance information, which fulfills the query. At step 118, the method concludes when the response is electromagnetically transmitted from the base unit 12 to the mobile unit.

Referring now to FIG. 3, it is a diagram illustrating a data communication protocol for communicating data from a mobile unit to a base unit in accordance with the invention and which can be used in conjunction with the system of FIG. 1 and the method of FIG. 2. The protocol illustrated in FIG. 3 is defined by a communications syntax including variable message lengths, allowing as little or as much data transfer as necessary for the specific application requirement. In this implementation example, the protocol can be used across all communications systems, as long as the printable, seven-bit ASCII character set, plus the "newline" character (0x0A) can be transmitted by the communications system.

The transmitted character set consists of the principal ASCII character set plus the newline character.

To transmit bytes of data which do not fit in this character set, or for communication protocols which do not allow transmission of the newline character, an escape mechanism is provided to allow transmission of these characters. For communication in binary format, numeric fields or numeric values are transmitted using two's complement notation, in network byte order (most significant byte first, followed by bytes of decreasing significance). Floating point numbers are transmitted using the IEEE 64-bit double precision format, with the most significant byte transmitted first.

Only a single query message 120 is needed to transmit a query from a mobile unit to the base unit 12 This query message 120 provides for both current location tracking information as well as route calculation requests. The query message 120 includes a plurality of fields 122. Each field of the plurality 122 of fields is separated by a delimiter, preferably the vertical bar "|" (ASCII code 0x7C). The start of the query message 120 begins with a delimiter character. The end of each message is marked by a delimiter character immediately followed by a newline character (ASCII code 0x0A), represented in FIGS. 3 and 4 as "\n". Any characters between the ending newline character and the starting delimiter are preferably ignored by the base unit 12 and the mobile unit.

As noted, the query message 120 includes a plurality of fields 122. Some communications transport protocols may prepend or append characters for controlling communication of the message in accordance with the specific hardware implementation of the system 10.

The query message 120 includes a message length field 124. This field specifies the length of the query message 120. The message length field 124 may also include a compression marker 125 indicating the compression status of the message. For example, the compression marker 125 may take on a first value if the query message 120 is compressed using a current phrase compression table. The compression marker 125 may take on a second value if the query message 120 is compressed using the current dictionary (bit compression) table. The compression marker 125 may take on a third value if the query message 120 is compressed using the L-Z (Lev-Zempel) compression algorithm. And the compression marker 125 may take on a fourth value or simply not be present if the query message 120 is not compressed in any way.

The query message 120 further includes a cyclical redundancy check (CRC) field 126. This field is preferably the computed CRC-16 of the query message 120, starting with the delimiter following the CRC field 126 up to and including the ending newline, as actually transmitted (i.e., as compressed). The query message 120 further includes a time stamp field 128 which gives the number of seconds since the epoch (00:00:00 GMT Jan. 1, 1970) when this message was sent. Preferably, messages older than 20 minutes will be ignored when received by the base unit 12.

The query message 120 further includes a subscriber identifier field 130. The information provided in this field may be used for billing and audit information. The query message 120 further includes a message identifier field 132. The characters in this field are used to tag response messages transmitted from the base unit 12 to the requesting mobile unit. The base unit 12 will place the characters in the message ID field 132 in any return message so that the mobile unit may determine what original message the base unit 12 is responding to. The query message 120 further includes an identifier field 134, which provides identification information uniquely identifying the mobile unit which transmitted the query message 120. The identification field 134 is used for tracking and communications addressing.

The query message 120 further includes a latitude field 136 and a longitude field 138. These fields specify the current position of the mobile unit by latitude and longitude, respectively. By default, the current latitude and longitude provide the origin for all routing requests, and also provide the position used for default tracking address translation.

The query message 120 further includes an origin field 140. The origin field 140 specifies the origin address for a routing information request. If this field is empty, the current position specified by the latitude field 136 and the longitude field 138 is used as the origin address. The query message 120 further includes an origin type field 142, which may be either an address or a point of interest category (such as "restaurant", "museum" or "airport") which is recognizable by the base unit 12.

The query message 120 further includes a destination field 144, which specifies the destination address if routing information is requested by the mobile unit from the base unit 12. If the destination field 144 is empty, then no route is calculated by the base unit 12. Instead, the message 120 is considered to be a tracking message only, merely providing the location of the mobile unit.

The query message 120 further includes a destination type field 146 which specifies the type of destination. For example, the destination may be an address or a point of interest category recognizable by the base unit 12. For example, the point of interest categories may include "restaurant", "airport", or "museum." As one example, the destination type field 146 may be "restaurant", and the destination field 144 may be "McDonald's™".

The query message 120 further includes a destination limit field 148. This field specifies a limit for point of interest searches. Such a search will be limited to the range specified by the value in the destination limit field 148 about the origin. For example, if the destination limit field 148 is empty or has a value 0, the base unit 12 preferably interprets this to indicate that the nearest point of interest satisfying the requirements specified by the destination field 144 and the destination type field 146 should be located. If the destination limit field 148 is non-zero, then the limit specified sets the maximum range searched for a matching point of interest. If no matching point of interest is in the range specified, a "no match" route error is returned.

The value of the destination limit specified in the destination limit field 148 depends on the limit type field 150. The limit type field 150 determines what unit of measurement is in the destination limit field. For example, the limit type field may take on a first value (for example "M") when the destination limit specifies a straight line distance. The limit type field 150 may take on a second value when the destination limit is driving distance. Or, the limit type field 150 may take on a third value when the destination limit is driving time, in minutes.

The query message 120 concludes with an ending field 152. The ending field 152 preferably includes the newline character, represented in FIG. 3 as "\n".

Before the ending field 152, the query message 120 may also include additional optional fields which specify additional information or service requests from the mobile unit to the base unit 12. For example, the query message 120 may additionally specify a text message to an operator of the base unit 12, or specify whether the base unit 12 should provide maneuver arms information or combined maneuver arms information along with route guidance text. The query message 120 can also specify, for example, whether the base unit 12 should send route stripmap information for a specified strip width with the returned route text, whether the base unit 12 should send responses in a language independent manner, and/or whether map information should be sent by the base unit 12 in bitmap or vector form.

Maneuver arms information is used to represent intersections along the route determined by the base unit 12. Combined maneuver arms information can be provided when two intersections are sufficiently close together. Further, the query message 120 can additionally specify routing options such as route calculations which avoid tolls, avoid left turns or avoid limited access roads, or specify a time of day for the start of the route. Still further, the message 120 could optionally request additional information from the base unit 12, such as a list of point of interest types, a list of points of interest matching search criteria or a list of files which may be communicated from the base unit 12 to the mobile unit to provide descriptive information.

Referring now to FIG. 4, FIG. 4 illustrates a data communications protocol for communicating data from a base unit to a mobile unit in accordance with the invention and which can be used in conjunction with the system of FIG. 1 and the method of FIG. 2. In FIG. 4, a response message 160 is illustrated as including a plurality of fields 162.

In accordance with the invention, the response message 160 may be transmitted in a continuous stream of data, called the burst mode, or in a plurality of discrete responses to queries for data, called the normal mode. The mode of data transmission can be specified by the mobile unit, for example, in an additional field included in the query message 120. In the burst mode, the base unit 12 transmits data as fast as possible, without waiting for requests from the mobile unit. In the normal mode, the base unit 12 sends a packet, then waits for the mobile unit to request the next packet before sending the next packet.

As mentioned above, the response transmitted from the base unit 12 to a mobile unit may include maneuver arms information. Maneuver arms are graphical vectors used by the mobile unit for displaying a graphical representation of an intersection to be traversed. At least three types of visual information can be transmitted by the base unit. These include a geometric representation of the intersection, including arms representing the streets approaching an intersection and the angles at which the streets approach the intersection. The transmitted information can further include which of the streets is included in the route to be travelled so that, for example, that street may be highlighted in the graphical display. The transmitted information can further include information about street signs located at the intersection.

In one embodiment, the maneuver arms information includes only sufficient data to create a display showing only what the driver of a vehicle containing the mobile unit will see as the driver traverses the displayed intersection. Other, extraneous information, such as a map of the region around the intersection or of the entire metropolitan region, is not transmitted.

Transmitting only a representation of intersections to be traversed, rather than extraneous information, greatly reduces data transmission and storage requirements. Thus, a relatively low bandwidth channel may be used for transmitting queries and responses between the base unit 12 and the mobile unit. For example, a channel having a bandwidth as low as 1,200 bits per second may be used. In contrast, transmitting extraneous information may require a bandwidth as high as 1 megabit per second. Since, with the invention, the amount of data transmitted is relatively small, the entire response, including maneuver arms information, may be transmitted in a reasonable time, even at a low bandwidth. In addition, since only pertinent information about intersections is transmitted, only a small amount of memory, such as memory 26 of the desktop personal computer 16 (FIG. 1) is required at the mobile unit.

After an intersection has been traversed, the display is, in general, updated to show the next intersection to be traversed, using maneuver arms information received from the base unit and stored in memory. The display can be updated in response to operator control, for example, by operating a switch or by voice control, or automatically in response to a position sensor such as the position locator 42 of the laptop personal computer 18 (FIG. 1).

The response message 160 preferably includes a message length field 164 which specifies the length of the response message 160. In addition, the message length field 164 may include a compression marker character 165. The compression marker character 165 may take on one of a number of values. For example, the compression marker character 165 may take on a first value if the response message 160 is compressed using the current phrase compression table. The compression marker character 165 may take on a second value if the response message 160 is compressed using the current dictionary (bit compression) table. The compression marker character 165 may take on a third value if the response message 160 is compressed according to the L-Z (Lev-Zempel) compression algorithm. The compression marker character 165 may take on a fourth value or simply not be present if the response message 160 is not compressed in any way.

The response message 160 further includes a CRC field 166 which is preferably the computed CRC-16 of the message 160, starting with the delimiter following the CRC field 166 up to and including the ending character of the message 160. The response message 160 further includes a time stamp field 168 which specifies the number of seconds since the epoch (00:00:00 GMT Jan. 1, 1970) when this message was sent. Preferably, messages older than 20 minutes will be ignored by the mobile unit which receives the message.

The response message 160 further includes a subscriber identifier field 170. This field preferably specifies information used for auditing, billing and authorization.

The response message 160 further includes a message identification field 172. In accordance with the invention, the contents of the message identification field 170 of the response message 160 match the contents of the message ID field 132 of the query message 120.

The response message 160 further includes an identifier field 174. Preferably, the contents of the identifier field 174 of the response message 160 match the contents of the identifier field 134 of the query message 120.

The response message 160 also includes a type field 176 and a message field 178. The type field 176 specifies the type of the message contained in the message field 178. For example, the type field 176 may have a first value (for example type "R") specifying that the message field 178 contains route tracking address translation information. Such a message would result: from the base unit 12 having received a route tracking query. The message in the message field 178 is then the address corresponding to the current position (latitude, longitude). The type field 176 may have a second value specifying that the message field 178 includes route guidance information. This message would result from the base unit 12 having received a route calculation request.

The message is the set of driving instructions. The instructions will contain several lines of text, each separated by carriage return/newline characters. There may be several messages of this type communicated for a single route. Each message will correspond to a single maneuver if arms are requested, or be the complete text if arms are not requested.

The message type field 176 may take on a third value to indicate that the message field 178 contains a download of information. This message would result from a query requesting particular information from the base unit 12. The type field 176 may take on a fourth value to indicate that the message field 178 contains an error message. For example, the latitude and longitude specified by the latitude field 136 and the longitude field 138 in the query message may be outside the specified metropolitan region, or the specified address may be invalid or not found for a route calculation. The message field 178 contains the error text defining the error.

The type field 176 may take on a fifth value to specify that the message field 178 contains a query response. Such a message would be the result of a query made of the database, for example requesting a list of point of interest types. The message field 178 includes the query data.

The response message 160 concludes with an ending field 180. Preferably, the ending field 180 includes the newline character, illustrated in FIG. 4 as "\n".

The use of maneuver arms will now be described in greater detail. Maneuver arms are used to depict roads at intersections. If maneuver arms information is requested by a remote unit, the base unit 12 generates the maneuver arms information in a maneuver arm generation module and provides this arms information for a current maneuver to the remote unit. The remote unit, for example computer 18, processes this information and displays the information on a display, for example display 46. The base unit 12 provides the information to the remote unit in the following form:

FromName; ToName; $x_1, y_1; x_2, y_2 [. . . ; x_n, y_n]$

"FromName" is the road being driven on at the beginning of the maneuver. "ToName" is the road being driven on at the end of the maneuver (except for the first maneuver). The x, y values specify the endpoints of the arms from an origin, which is set at the intersection. Each arm starts at the origin and radiates outward to an endpoint x, y. In one preferred embodiment, x and y are integer values between −100 and +100. The base unit 12 scales and rotates the arms so that the from road is vertical on the display and approaches the intersection from the bottom. If there are any arms, in general there will be at least two: a first arm to represent the "from" road using $x_1$ and $y_1$, and a second arm to represent the "to" road using $x_2$ and $y_2$. Other arms specified by $x_n$ and $y_n$ are used to represent any additional roads at the intersection. The signs of the x and y coordinates are shown in FIG. 5.

In one embodiment, the endpoint coordinates of the first, or from, arm are 1, 99 so that the first arm appears to be going straight up from the bottom of the display to the origin. The other arms are mapped relative to the position of this first arm. In this embodiment, endpoint coordinates of 99, −1 correspond to an approximately 90° right turn from the first arm. Endpoint coordinates of −99, 0 correspond to an approximately 90° left turn from the first arm. Endpoint coordinates of 1, −100 correspond to proceeding straight: ahead through the intersection.

For the first maneuver, the ToName can represent a cross street near the beginning of a route to orient the driver even though this cross street is not to be turned onto.

FIGS. 6 to 10 illustrate examples of displays in a remote unit in the course of a trip from 1550 Rockwood St., Los Angeles, to 280 Emerald St., Los Angeles. In this example, after the driver enters the from information "1550 ROCKWOOD ST, LOS ANGELES" and the to information "1280 EMERALD ST, LOS ANGELES" the display in the remote unit informs the driver of the approximate driving distance and driving time by displaying "ABOUT 0.4 MILES, 3 MINUTES" (not shown in FIGS. 6 to 10). Then, as the driver proceeds, the display displays the textual and graphic information shown in FIGS. 6 to 10. The directions in textual form are displayed on the left, and corresponding maneuver arms are graphically displayed on the right based on the x, y endpoint coordinates received from the base unit 12. The exact appearance of the display, for example, road width and road edge color, can be customized by the remote user.

Figure 11:
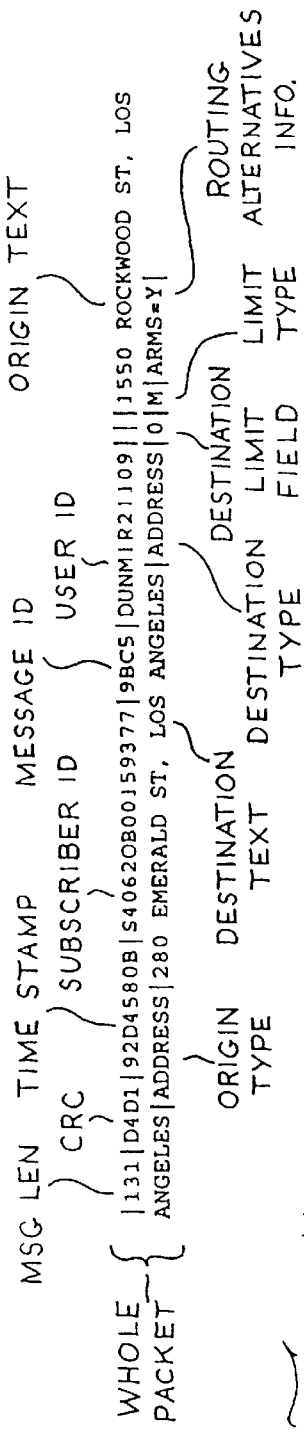
Figure 12:
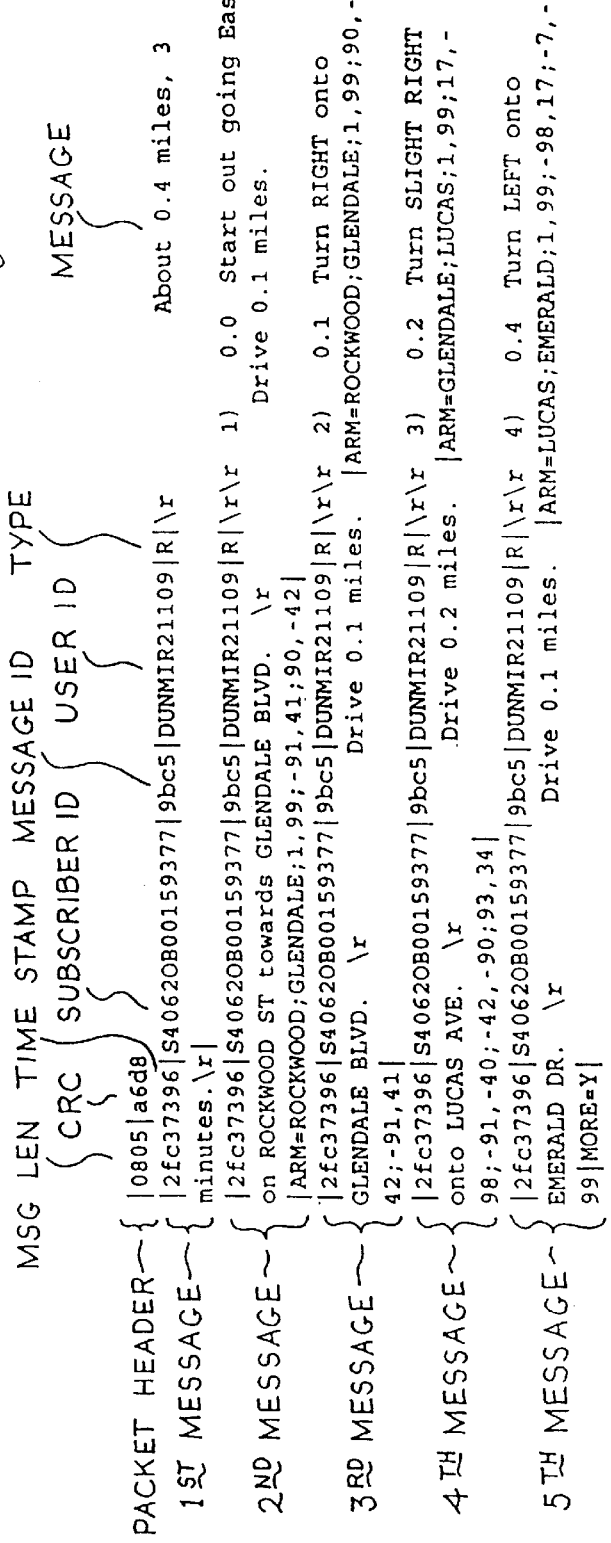

FIGS. 11 to 14 illustrate the data transferred between the remote unit and the base unit in the example of FIGS. 6 to 10. More specifically, FIG. 11 illustrates the packet transmitted from the remote unit to the base unit. FIG. 12 illustrates the packet issued from the base unit in response. FIG. 13 illustrates a second communication from the remote unit to the base unit. And, FIG. 14 illustrates a corresponding response from the base unit. In the example of FIGS. 11 to 14, not all of the fields shown in FIGS. 3 and 4 are needed and are thus omitted.

As shown by the "ARMS=Y" designation in an optional routing alternatives field, the request in FIG. 11 includes a request for maneuver arms information. In the second message in FIG. 12, the base unit begins to send maneuver arms information, in the format described above, via the "ARM=ROCKWOOD,GLENDALE;1,99;−91,41;90,−42" instruction. The optional "MORE=Y" instruction in the fifth message of FIG. 12 indicates that there are more packets of messages to follow. The "MANEUVER=NEXT" and "ARMS=Y" instructions of FIG. 13 direct the base unit 12 to send the additional information, including maneuver arms information. This additional information is sent via the packet shown in FIG. 14.

FIGS. 15 to 38 illustrate additional examples of data transferred between a remote unit and a base unit. FIG. 15 illustrates a packet sent by a remote unit to a base unit which constitutes the initial log-in communication that sets a non-burst mode and a 1K maximum packet size. FIG. 16 illustrates the response to the request of FIG. 15. FIG. 16 is a response which merely acknowledges the request of FIG. 15 because there is insufficient information for a route request or a query.

FIG. 17 illustrates a request to use a Los Angeles, Calif. database for future requests and FIG. 18 illustrates the corresponding acknowledgement.

FIG. 19 illustrates a request for a route from 950 S. Flint Ridge Way to 2043 N. Sacramento along with maneuver arms. FIG. 20 illustrates a first packet in response to the request of FIG. 19. FIG. 21 illustrates a request from the remote unit to the base unit to send the next packet of instructions along with maneuver arms.

FIG. 22 illustrates a response providing the next packet, as requested. FIG. 23 illustrates a request for the next block of instructions and FIG. 24 illustrates the next block of instructions. Finally, FIG. 25 illustrates a request for the last block of instructions and FIG. 26 illustrates the corresponding response.

Thus, FIGS. 19 to 26 together illustrate the communications to provide the route from 950 S. Flint Ridge Way to 2043 N. Sacramento.

FIG. 27 illustrates a request for a route from 1750 Queens Road to 7530 Orangethorpe, along with maneuver arms. FIG. 28 illustrates the packet giving the first block of instructions in response to the FIG. 27 request.

FIG. 29 requests the next block of maneuvers. And, FIG. 30 illustrates the final block of maneuvers.

FIG. 31 illustrates a request for a list of all points of interest (POIS) of the restaurant type with "HAPPY" in their name within 10.0 miles (encoded as "100" and "M") of 1855 W. Katella Avenue. FIG. 32 illustrates the response indicating that there are no such points of interest found which satisfy the given criteria. FIG. 33 illustrates another request for a list of points of interest of the restaurant type with "HUNGRY" in their name within 10.0 miles of 1855 W. Katella Avenue. FIG. 34 illustrates the corresponding response providing the information for two points of interest satisfying the criteria set forth in the message of FIG. 33. In FIG. 34, "HUNGRY TIGER SEAFOOD RESTAURANT" at "6231 MANCHESTER BLVD, BUENA PARK" is the first point of interest. The "36" is the type of point of interest, i.e., restaurant.

The "23606" is a unique identification number for the point of interest. The "0-0-223-137,4,1" specifies the restaurant location relative to a known node in the metropolitan region. The "46646" is the distance to the restaurant in feet and the "N" indicates that no additional information regarding the restaurant is available.

FIG. 35 is a packet sent from a remote unit to a base unit which requests a list of points of interest of the restaurant type with "BURGER" in their name within 10.0 miles of 1855 W. Katella Avenue. FIG. 36 illustrates the first packet in response to the request of FIG. 35. FIG. 37 requests additional points of interest in response to the request of FIG. 35. FIG. 38 provides additional points of interest satisfying the criteria in the request in FIG. 35.

Figure 39:
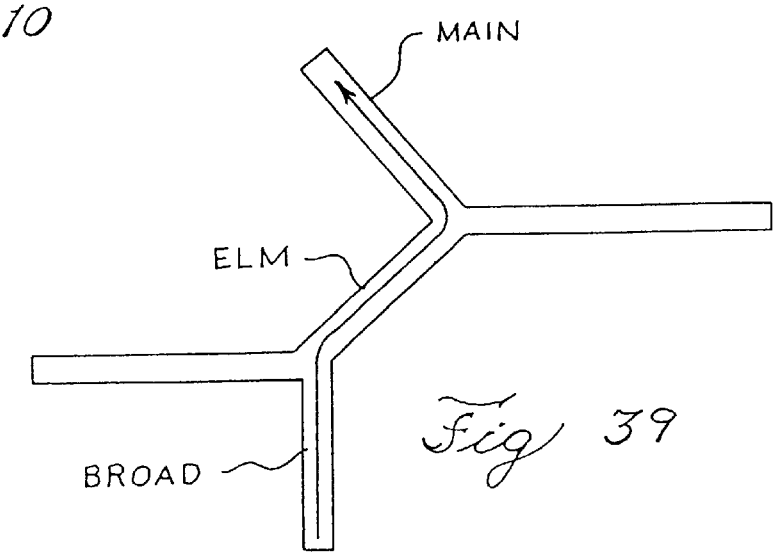
FIG. 39 illustrates a combined maneuver arms display.

The invention generates combined maneuver arms in situations where turns are required at two different intersections which are close together. FIG. 39 illustrates an example of a combined maneuver arm. In the example of FIG. 39, a slight right turn is required at the corner of Broad Street and Elm Street and a left turn is required at the intersection of Elm Street and Main Street. Instead of generating maneuver arms for the Broad-to-Elm turn and another set of maneuver arms for the Elm-to-Main turn, the invention generates a single combined maneuver arms display, as shown in FIG. 39, by the following process.

For each set of maneuver arms generated at an intersection, the base unit 12 determines whether there is a sufficiently close intersection at which the driver must turn. If sufficiently close intersections requiring turns occur, then the maneuver arms information for both of these intersections are merged for a single combined maneuver arms display such as that shown in FIG. 39. For the combined maneuver arms, the roads are designated by sets of endpoints, similar to that described above in connection with FIG. 5. One acceptable form for combined maneuver arms is as follows:

FromName, ToName, $ox_a$, $oy_a$, $x_{a1}$, $y_{a1}$; $x_{a2}$, $y_{a2}$; $x_{an}$; $y_{an}$: ToName, $ox_b$, $oy_b$, $x_{b1}$, $y_{b1}$; $x_{b2}$, $y_{b2}$; $x_{bn}$, $y_{bn}$ The $ox_a$ and $oy_a$ coordinates specify the coordinates of the first, or $a^{th}$, intersection, or origin, and the $ox_b$ and $oy_b$ coordinates specify the coordinates of the second, or $b^{th}$, intersection, or "origin." The arms are specified with respect to these origins. For example, $x_{a1}$ and $y_{a1}$ are the endpoint coordinates of the 1$^{st}$ road at the first, or $a^{th}$, intersection. To conserve space, coordinates for "origins" other than the first can be omitted because they can be reconstructed from the from/to arm data.

Combined textual information is also displayed along with combined maneuver arms. Thus, along with the graphic display shown in FIG. 39, the following textual instructions are also displayed: "Turn slight right on ELM ST. followed shortly by a left turn onto MAIN ST. Drive 5.6 miles." Three or more intersections can be combined.

An additional feature of the invention is the transmission of message information, that is, the information in message field 178 in FIG. 4, in a further compressed form. The use of such a form has at least two advantages. First, use of such a form allows message information to be transmitted electromagnetically in a more efficient way. Second, use of such a form allow transmission of information from the base unit 12 to a remote unit in a language independent manner. Upon receipt of the information in this form, the remote unit then converts the information for display into expanded textual instructions in any desired language such as English, Spanish, Japanese, and/or German. This form will generally be referred to herein as the language independent form or language independent mode.

In the language independent mode, the textual description of maneuvers are generated by a token generation module in base unit 12 and are transmitted to the remote unit in a tokenized form. For example, instructions to:

Turn left on W. MAIN ST. and drive 4.3 miles.
Would be transmitted as:
3,W. MAIN ST.,4.3.

In this example, the "3" represents the English instruction to:

Turn left on [blank 1] and drive [blank 2] miles.

The "W. MAIN ST." field is the information to be inserted in the [blank 1] position (corresponding to a street sign) and the "4.3" field is the information to be inserted in the [blank 2] position. If German language instructions are desired, then the remote unit displays the following text for a type "3" instruction:

Auf [blank 1] links abbiegen und [blank 2] Meilen weiterfahren.

Thus, using the 5th message of FIG. 12 as another example, instead of transmitting "Turn LEFT onto EMERALD DR. \r Drive 0.1 miles." the following tokenized information is transmitted to convey the same information in a much more compact form:

3,EMERALD DR.,0.1

Figures 40, 41:
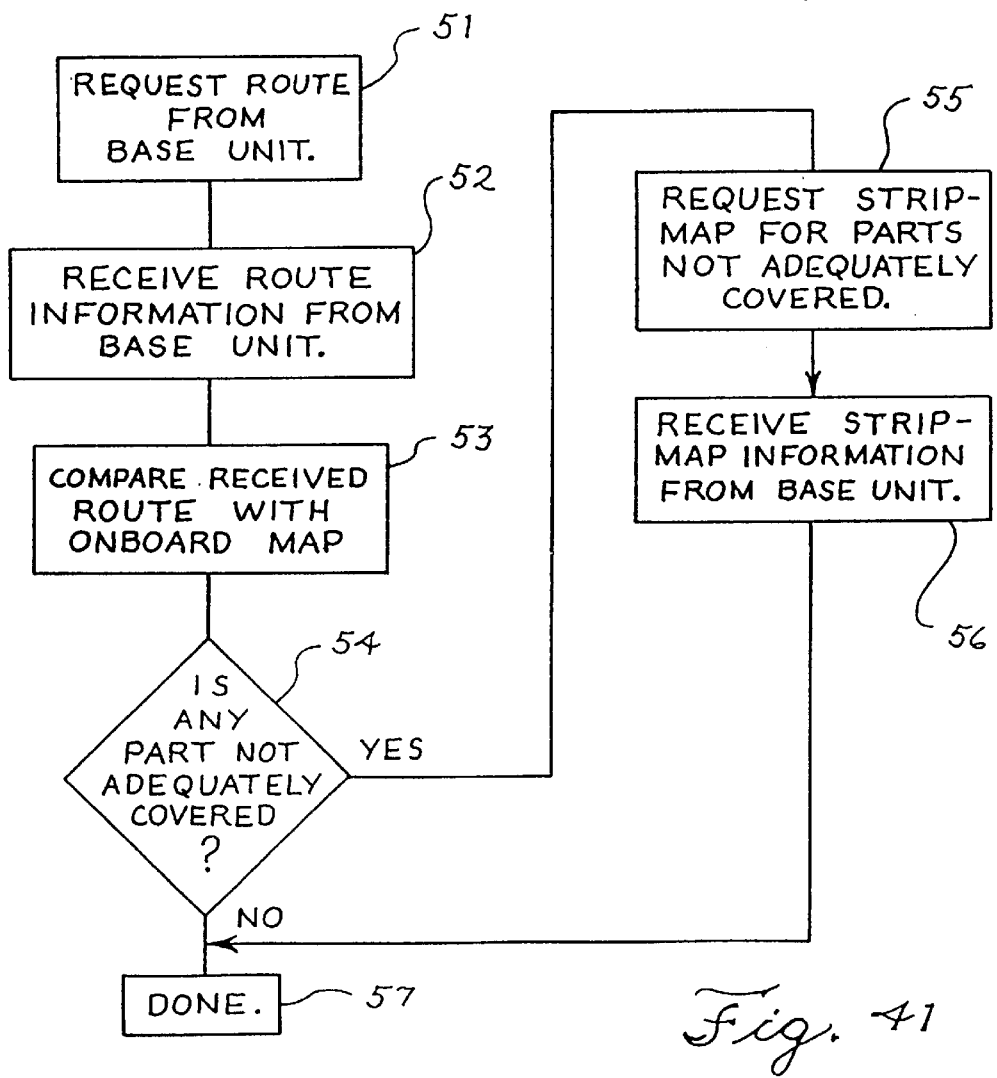
FIG. 40 illustrates some examples of tokens and corresponding expanded English, Spanish, and German text.
FIG. 41 is a flowchart used for explaining operation of a stripmap request feature of the invention.

FIG. 40 provides additional examples of tokens and corresponding expanded text in English, Spanish, and German.

Upon receiving the tokenized route information, the remote unit applies a set of translating instructions contained in a lookup table implemented, example, in computer 18, one table per language, or sounding, desired. For example, the English token translation instructions for a type 3 token indicate that "Turn left on" is displayed, then the signage or street name, then "and drive," then the distance, and then "miles." The remote unit can be equipped with a set of buttons for the user to specify the desired language(s).

Translation instruction can be more or less complicated and can include conditions for added flexibility. For example, the English token translation instructions for a type 5 instruction indicate that "Follow the sign" is displayed first, then if the number of signs in the message is greater than one an "s" should be added to "sign," then the sign(s) should be displayed, then "on the ramp." should be displayed. Thus, in one instance a type 5 token might produce, expanded English maneuver text of:

Follow the signs TO O'HARE, TO INDIANA on the ramp.

In another instance, a type 5 token might produce the expanded English maneuver text of:

Follow the sign TO CHICAGO on the ramp.

The remote unit can also convert the miles, information into kilometers, if desired.

Thus, in the language independent mode, information is transmitted from the base unit without regard to any particular language. Accordingly, the transmission bandwidth does not depend on the language of the instructions to be displayed on the display in the remote unit. Because the remote unit produces the actual text portion, routes can be presented in more than one language or way either concurrently or serially, as desired by the remote user, without the need for additional information from the base unit.

Use of tokens allows remote system users to create their own language formats, if desired, to best fit particular needs and capabilities. Alternatively, a remote unit can download language formats (that is, expanded text corresponding to various tokens) that have already been created from the base unit.

The base unit can also provide the remote units with other information in addition to the textual directions and maneuver arms information discussed above. In some applications, a remote user desires more information than just the textual directions and maneuver arms information and more information than is stored and maintained in the remote unit. For various practical reasons, such as cost, remote units generally have at best only a limited database on-board. Such a limited database may, for example, include information and/or maps for a limited metropolitan area.

Even though a remote user may have no or a limited on-board database, the invention allows the remote user to obtain a large amount of information from the base unit. Thus, the invention allows a remote unit to access a large amount of information without burdening the remote unit with storage and maintenance of a large database. Such information can include, for example, maps for a complete route (not just information about intersections which require turns) or maps for an area which is simply not covered by any on-board database.

FIG. 41 is a flowchart which illustrates the operations in a remote unit, such as computer 18, for determining whether the remote unit needs additional information from the base unit and for obtaining such additional information when it is needed. In the operations illustrated in FIG. 41, the remote unit has at small on-board database.

In step S1, the remote unit requests a route between an origin and a destination from the base unit using the protocol shown in FIGS. 3 and 11. The base unit 12 calculates the route in route calculator 66 and this route is received in the remote unit in step S2. In step S3, the remote unit compares the route received from the base unit with map information stored on-board the remote unit. In a preferred embodiment, the comparison is made on a node basis. If any part of the route is not adequately covered by on-board maps in terms of geographic scope/bound or level of detail/content, as determined at step S4, then the processing proceeds on to step S5. Otherwise, the processing proceeds on to step S7 and is completed.

In step S5, the remote unit requests, from the base unit 12, stripmaps for those portions of the route which are not adequately covered by maps available on-board the remote unit. Maps are not requested for areas which are adequately covered by on-board maps. A stripmap can be relatively simple or it can be fairly detailed and include side roads, intersections, points of interest, and features for map-matching in the remote unit. In step S6, the remote unit receives the requested strip-map information from the base unit.

A similar procedure is used when a route is within the area covered by the on-board database but the base unit has more up-to-date information. The remote unit can also download updated maps, new programs, and the like. Remote units without any on-board database must obtain all information from the base unit. A remote unit specifies what information it needs, using the above-described protocol, based on what information the remote unit desires and can handle.

Included herewith as Microfiche Appendix A is a copy of computer code for implementing the packet/message interpretation and parsing functions described above.

As can be seen from the foregoing, the invention provides a system and method for providing graphically referenced information from a base unit or server to a mobile unit in a compact form. The invention allows the mobile unit to operate with limited or no database storage or position sensor requirements. Software for controlling the mobile unit runs on generic hand-held devices or desktop computers with wireless or wireline communications capability. A query, communicated from the mobile unit to the base unit, and the response, communicated from the base unit to the mobile unit, are packaged into a standard data communications protocol that manages a broad spectrum of queries and responses available. This approach to providing route guidance information allows automatic real time database updates and corrections at the base unit, avoiding database distribution problems. In addition, the cost and technical requirements for the on-board or mobile unit equipment are substantially lower than for prior art route guidance information systems.

It is to be understood that, while the detailed drawings and specific examples given describe preferred embodiments of the invention, they are for the purpose of illustration only. The invention is not limited to the precise details disclosed, and various changes may be made therein. For example, the format or protocol of the query message and the response message, illustrated in FIGS. 3 and 4, respectively, may be modified to request different types of information from the map database or to specify different formats or subsets of information to be conveyed to the mobile unit. Such changes may be made without departing from the spirit of the invention which is defined by the following claims.

What is claimed is:

1. A method of expanding the amount of information available to a remote unit in a routing system having a base unit and a remote unit, comprising the steps of:

(a) electromagnetically transmitting a route request from the remote unit to the base unit;

(b) electromagnetically transmitting data representing a route from the base unit to the remote unit in response to the route request of step (a);

(c) receiving in the remote unit the data representing a route transmitted in step (b);

(d) in the remote unit, using a navigation application program to compare the data representing a route received in step (c) with coverage of databases on-board the remote unit;

(e) if an entire route received in step (c) is not covered by said databases on-board the remote unit, electromagnetically transmitting from the remote unit to the base unit a request for the base unit to provide information in addition to that which is covered by said databases on-board the remote unit; and (f) receiving in the remote unit said information in response to the request of step (e).

2. The method as set forth in claim 1, wherein step (f) includes receiving in the remote unit map information which is not adequately covered by said databases on-board the remote unit in response to the request of step (e).

3. A routing system which makes a large amount of information available to a remote unit, the system comprising:

(a) a base unit;

(b) a remote unit including a navigation application program installed therein; and (c) a communications link to electromagnetically transmit a route request from the remote unit to the base unit and to electromagnetically transmit data representing a route from the base unit to the remote unit in response to the route request;

wherein the remote unit (i) receives the data representing a route transmitted by the communications link, (ii) compares the data representing a route received with coverage of databases on-board the remote unit, (iii) uses said navigation application program to determine what additional data is needed, and (iv) electromagnetically transmits from the remote unit to the base unit, via the communications link, an additional request for the base unit to provide said additional information.

4. The routing system as set forth in claim 3, wherein the remote unit receives map information which is not adequately covered by said databases on-board the remote unit in response to said additional request.

5. A system for providing navigation features to remote mobile navigation units comprising:

a plurality of remote navigation units each of which is installed in a respective one of a plurality of vehicles, wherein each of said plurality of remote navigation units is comprised of:

a position indicator that provides an output indicative of a geographical position thereof;

an input device that provides for receiving a request for a navigation function from a user;

a first processor coupled to receive outputs from said position indicator and said input device, and further wherein said first processor executes a first navigation application program to provide the requested navigation function to the user of the remote navigation unit;

a first geographic database installed in said remote unit and used in conjunction with the first navigation application program executed on the first processor of the remote navigation unit;

wherein said first navigation application program determines what additional data beyond what is included in said first geographic database is required to provide said requested navigation function to the user; and a first wireless communications system coupled to said first processor to provide for sending requests for said additional data and receiving responses to said requests; and a base unit comprised of:

a second wireless communications system that provides for receiving said requests for said additional data from each of said plurality of remote navigation units and sending responses thereto;

a second geographic database; and a second processor coupled to said second wireless communications system and said second geographic database, wherein said second processor executes a second navigation application program that prepares responses to said requests from the plurality of remote navigation units using said second geographic database and sends said responses to said plurality of remote navigation units using said second wireless communication system; and wherein said first navigation application program provides said requested navigation function to the user using data from said first geographic database and said additional data from said second geographic database.

6. The invention of claim 5 wherein said navigation function requested by the user includes calculation of a route between an origin and a destination.

7. The invention of claim 5 wherein said navigation function requested by the user includes display of map data.

8. The invention of claim 5 wherein said navigation function requested by the user includes display of strip maps.

9. The invention of claim 5 wherein said navigation function requested by the user includes a request for more up-to-date information.

10. The invention of claim 5 wherein said input device provides for selection of a destination.

11. A method of providing navigation information to a plurality of users of remote navigation units comprising the steps of:

on each of said plurality of remote navigation units, receiving a request for navigation information from a user;

executing a first navigation application program that uses a first geographic database installed in said remote navigation unit to provide a first part of a response to said request for navigation information and determine whether additional data are to be requested from a base unit;

using a wireless communication system to communicate a request to said base unit navigation system to obtain said additional data related to said request for navigation information as determined by said navigation application program;

receiving said additional data related to said request from said base unit navigation system;

combining said first part of a response with said additional information to provide a combined response; and providing said combined response to said user.

12. The invention of claim 11 wherein said step of using a wireless communication system to communicate a request further comprises:

requesting a route between an origin and a destination.

13. The invention of claim 11 wherein said step of using a wireless communication system to communicate a request further comprises:

requesting map data for areas that are not adequately covered by said first geographic database.

14. The invention of claim 11 wherein said step of using a wireless communication system to communicate a request farther comprises:

requesting strip maps.

15. The invention of claim 11 wherein said step of using a wireless communication system to communicate a request further comprises:

requesting more up-to-date information than is contained in said first database.

16. A method for providing improved navigation services to a plurality of remote navigation units comprising the steps of:

on a remote unit comprising a first navigation system that includes a first geographic database and a navigation application program, receiving input from a user for a desired navigation function to which a response requires geographic data;

from the remote unit, using said navigation application program to transmit a request for part of said geographic data not in said database determined by said program as required to provide said desired navigation function;

on a base unit comprising a second navigation system that uses a second geographic database, receiving said request and providing said part of said geographic data using said second geographic database;

from said base unit, transmitting said part of said geographic data to said remote unit; and in said remote unit, receiving said part of said geographic data from said base unit and using said part of said geographic data received from said base unit along with data from said first geographic database to provide said desired navigation function to said user.

17. The method of claim 16 wherein said desired navigation function comprises calculation of a route between an origin and a destination, wherein said request for part of said geographic data comprises a calculated route, and wherein said step of using includes map display.

18. The method of claim 16 further comprising the step of:

on said remote unit, after receiving said part of said geographic data, comparing said part with data in said first database and then requesting additional data from said base unit.

* * * * *